Aug. 12, 1930.  J. BALTON  1,772,450
AUTOMATIC CUP PASTRY MAKING MACHINE
Filed May 27, 1929   15 Sheets-Sheet 1
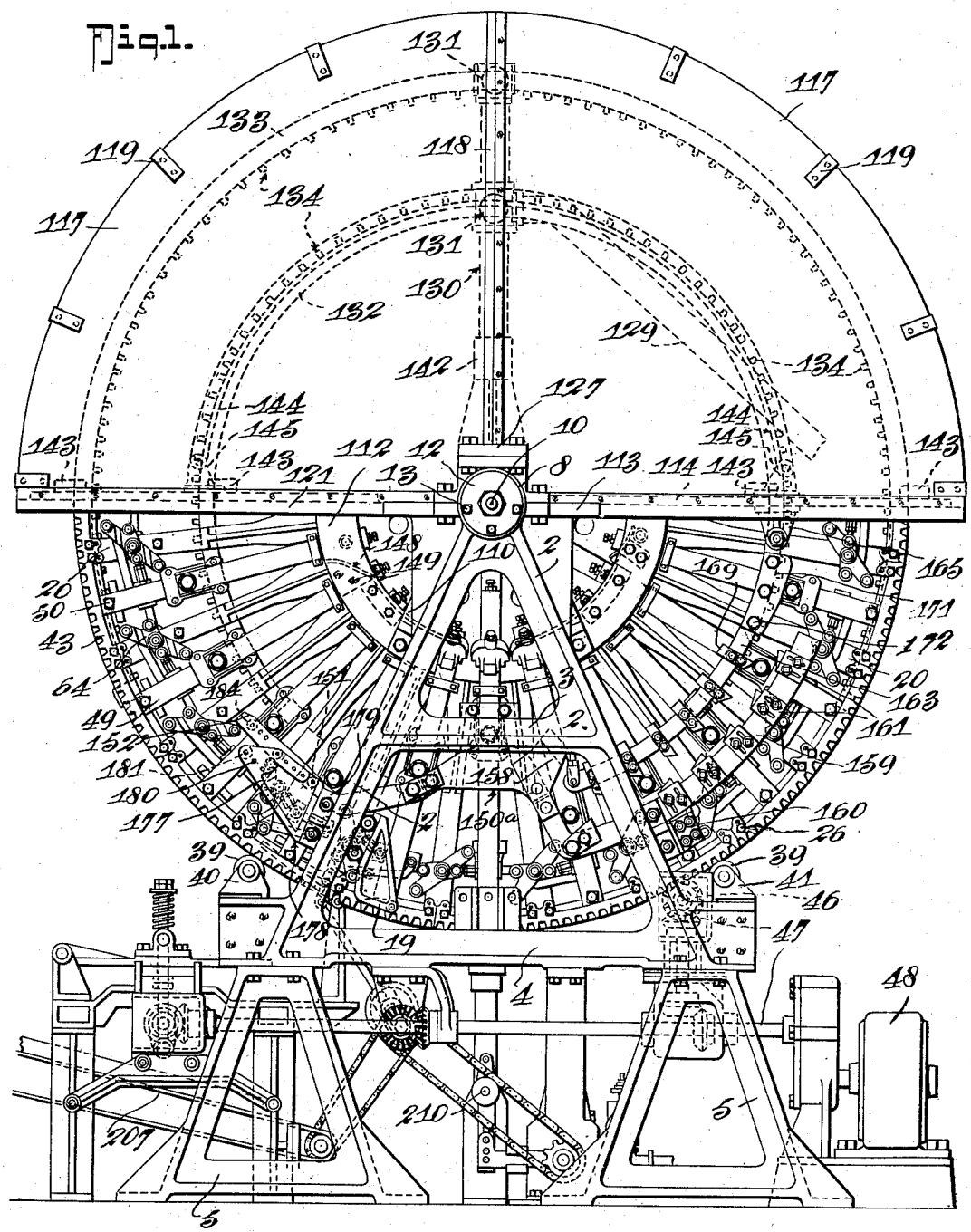
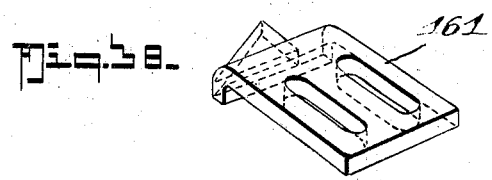
INVENTOR
James Balton.
BY
Albert F. Dutrich
ATTORNEY

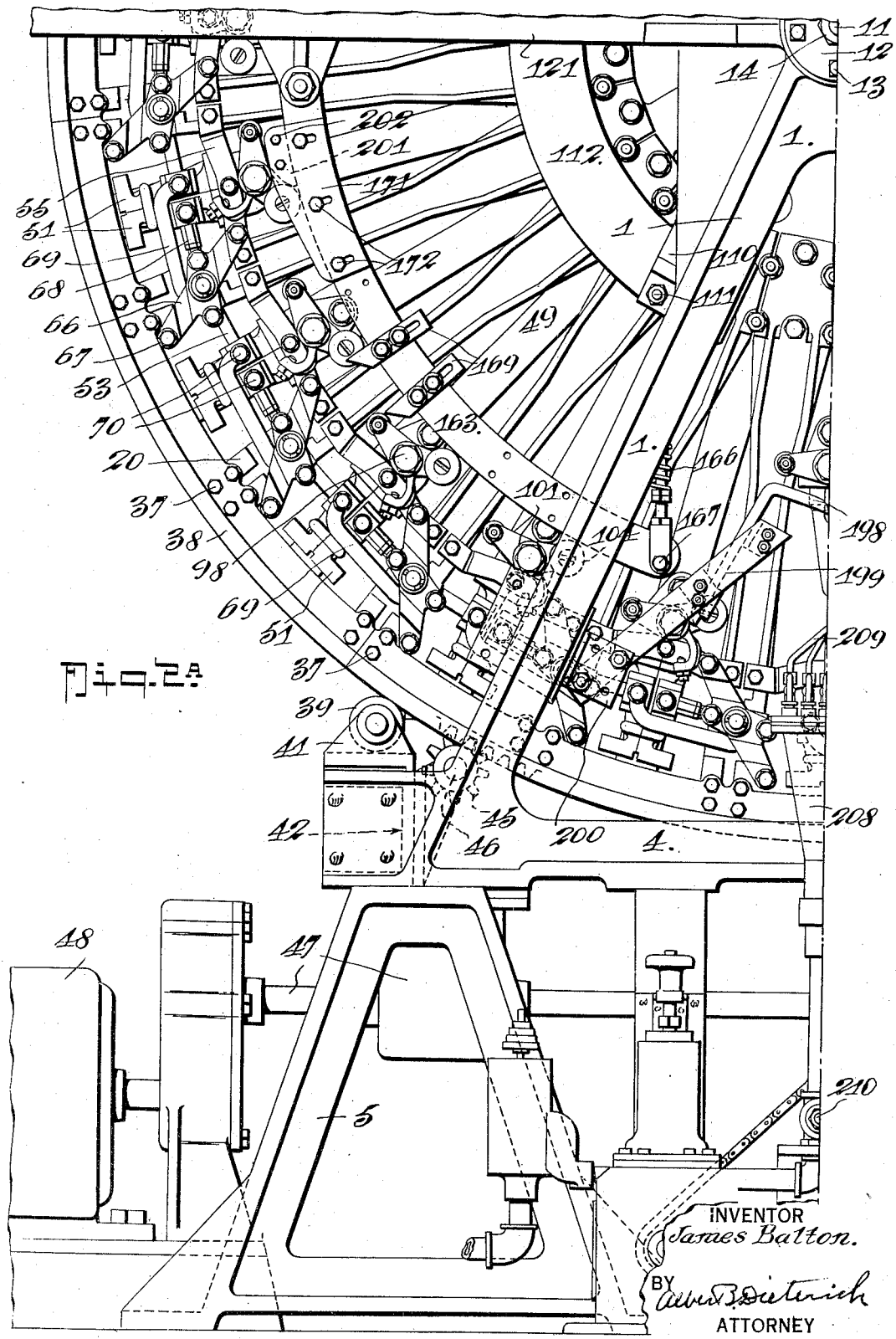

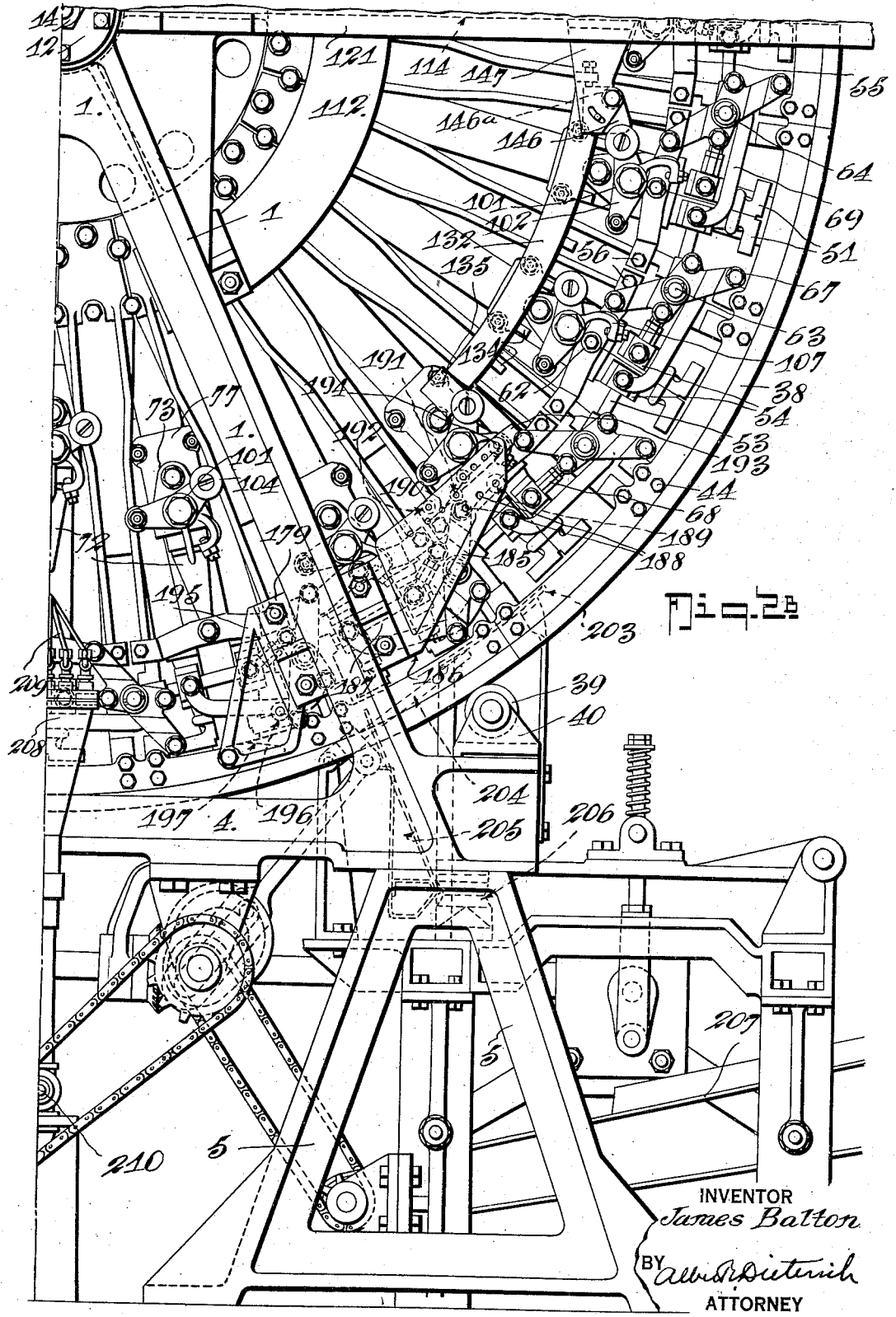

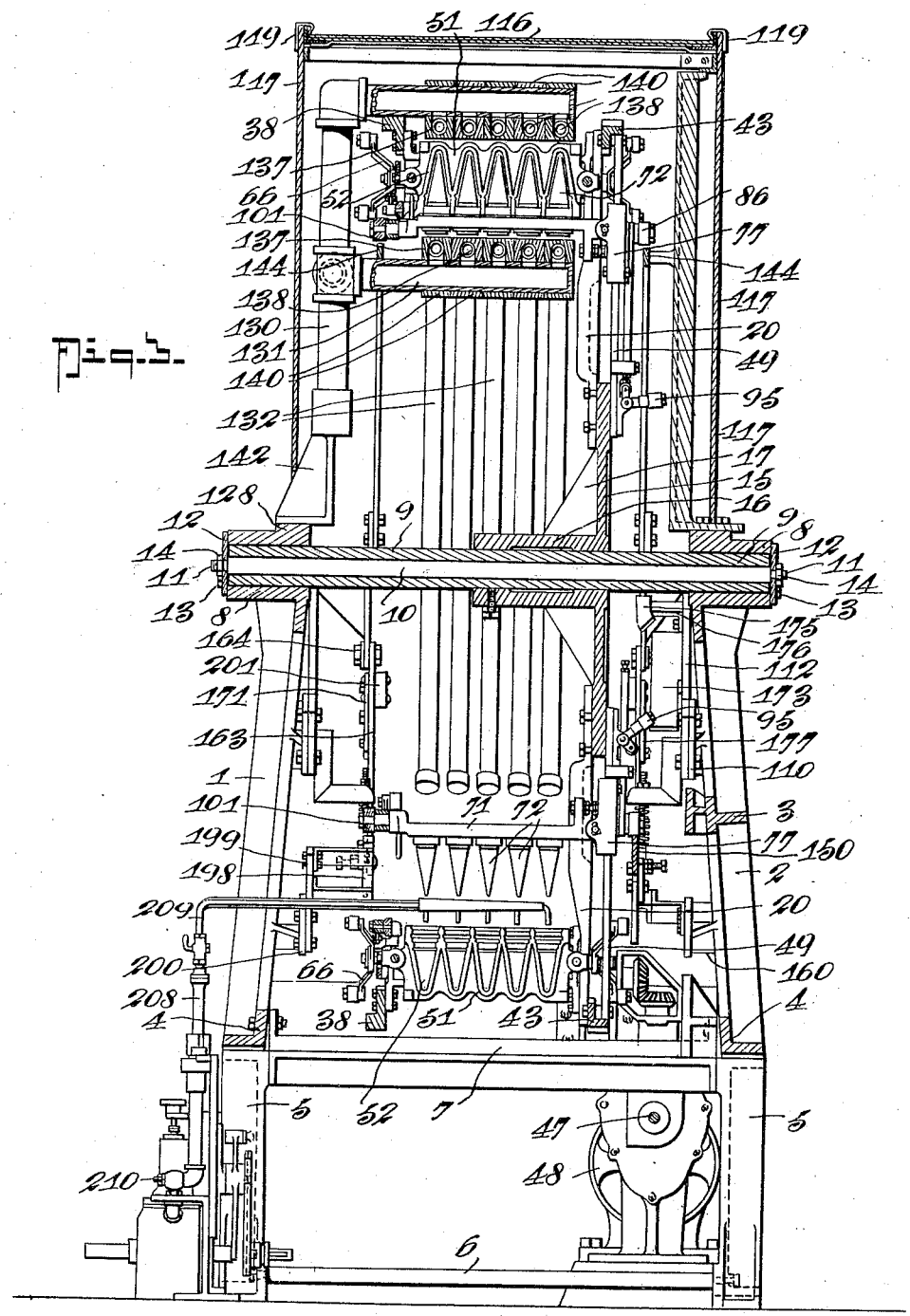

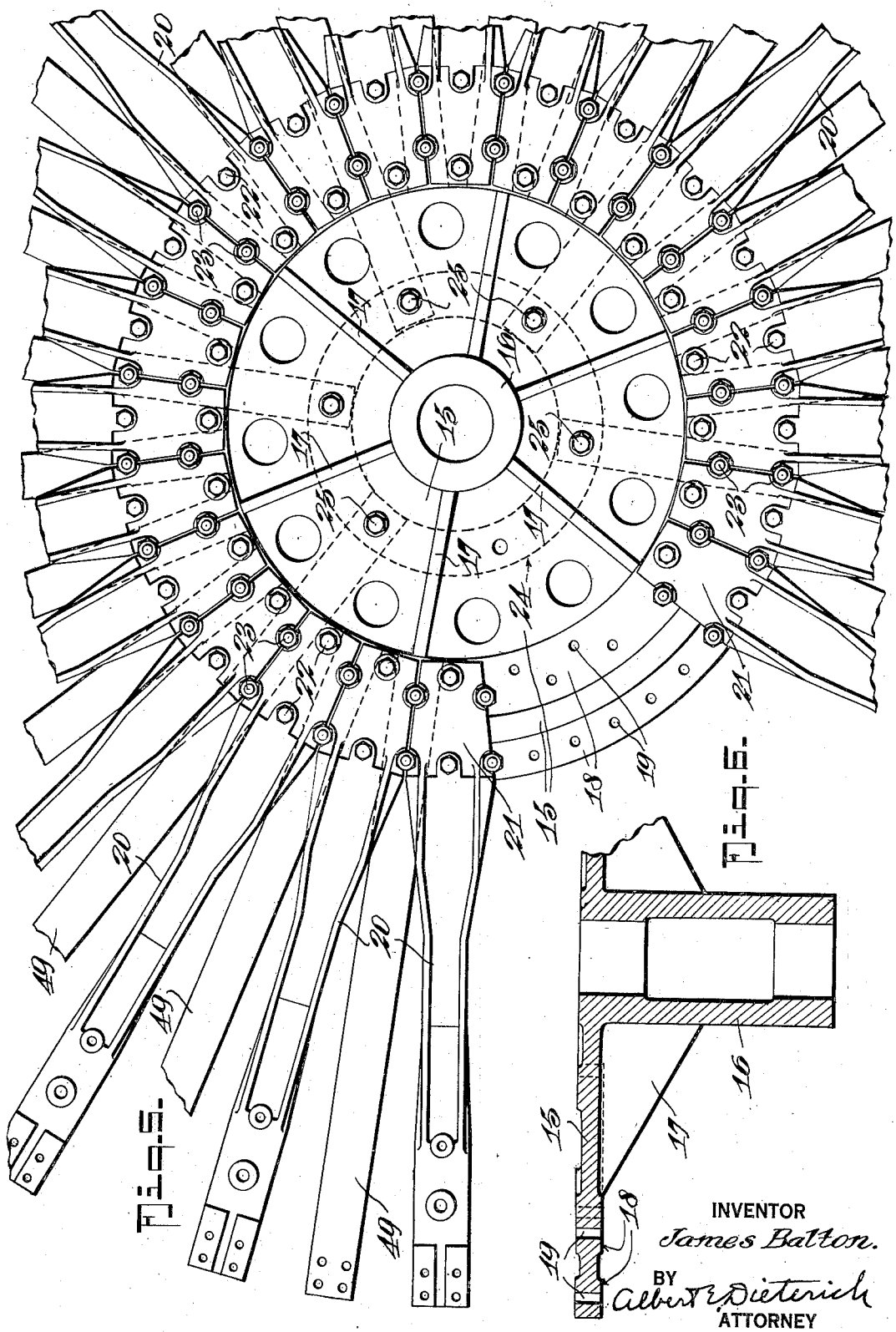

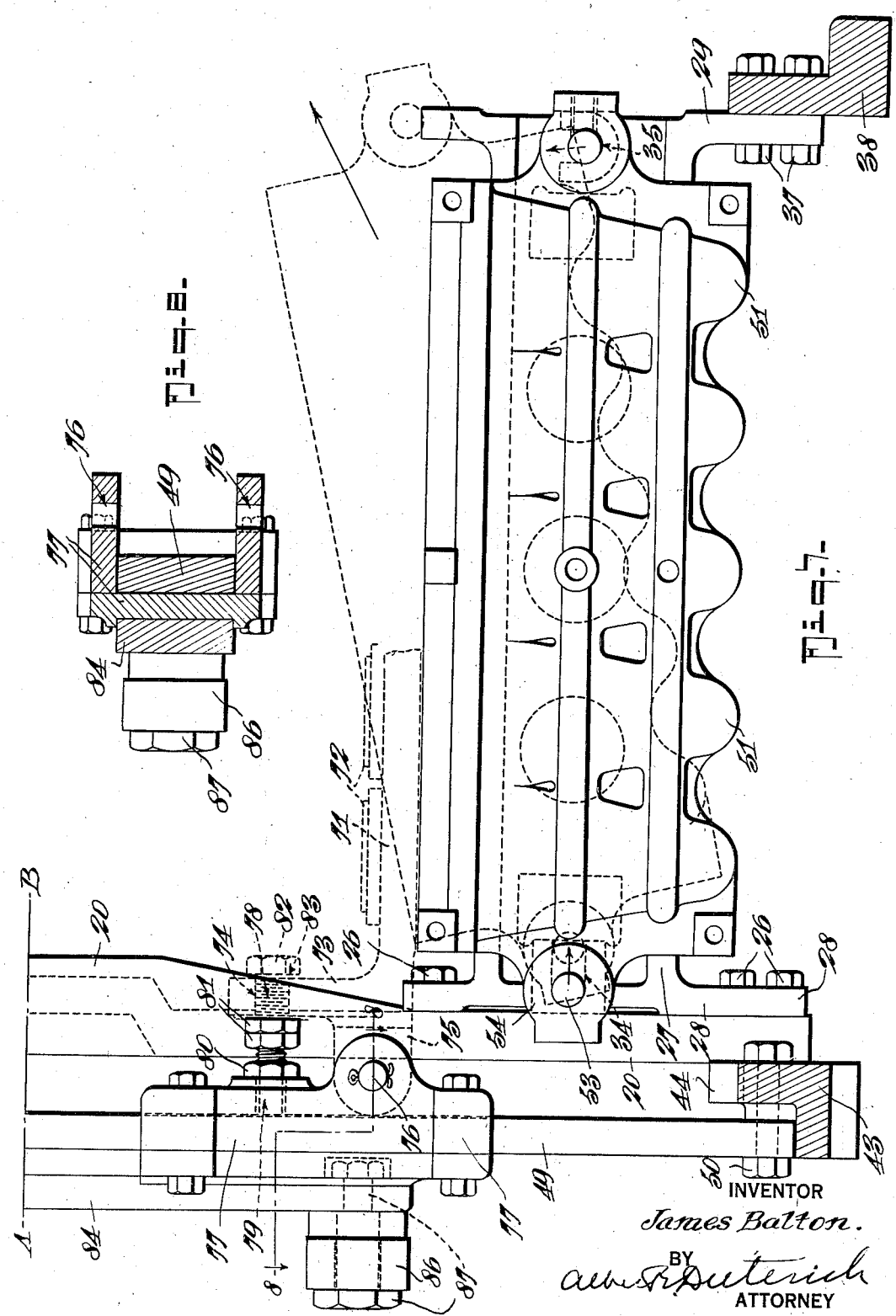

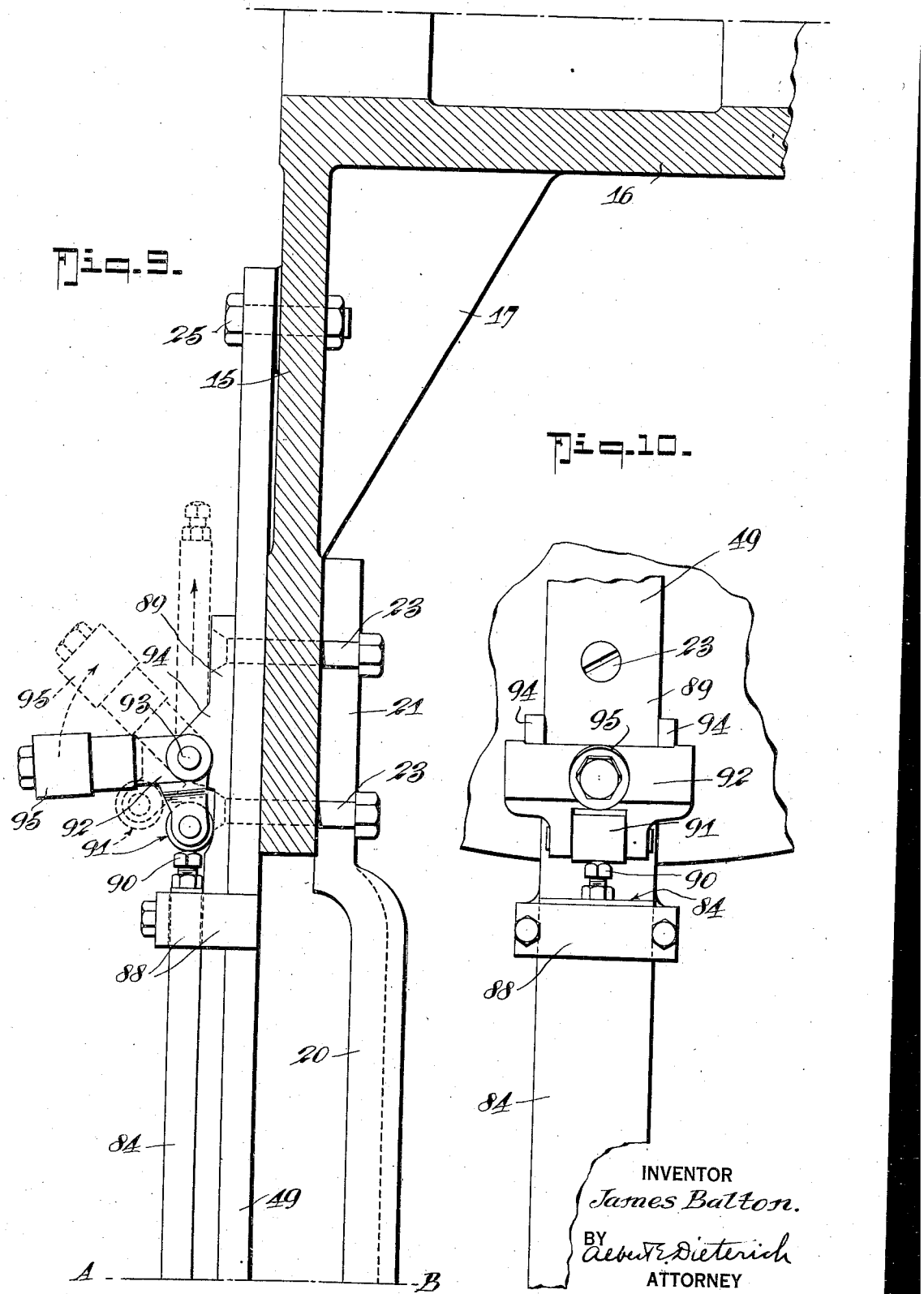

Aug. 12, 1930.  J. BALTON  1,772,450
AUTOMATIC CUP PASTRY MAKING MACHINE
Filed May 27, 1929  15 Sheets-Sheet 8
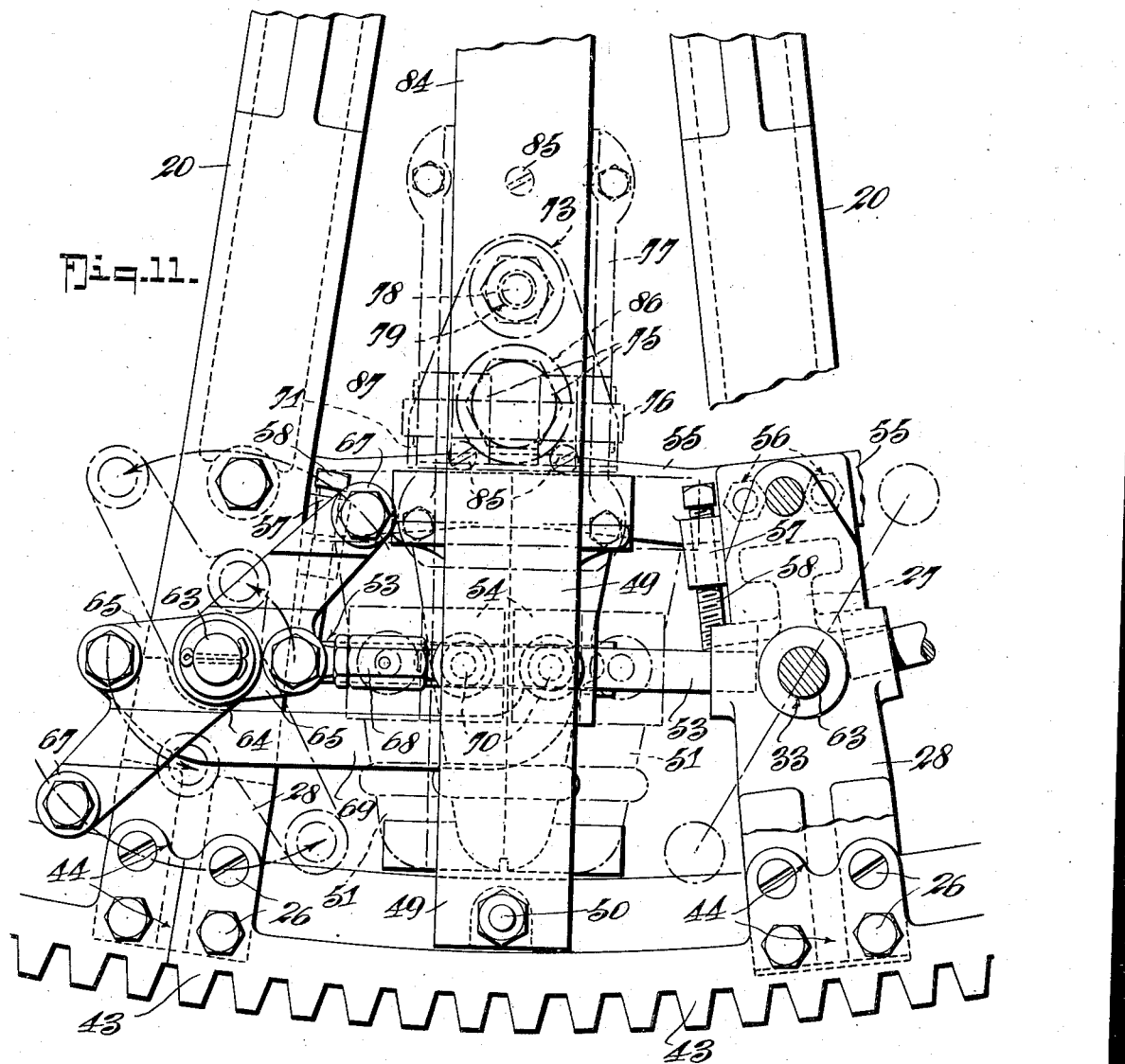
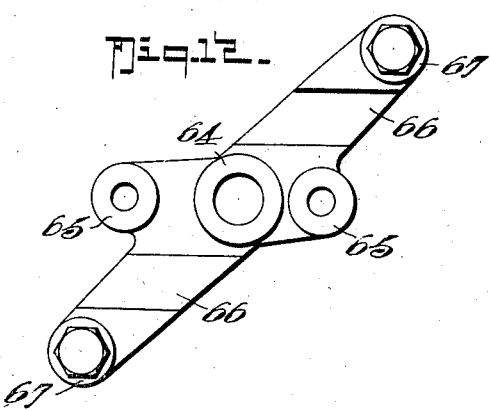
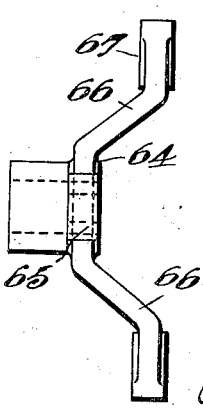
INVENTOR
James Balton.
BY
Albert F. Dietrich
ATTORNEY

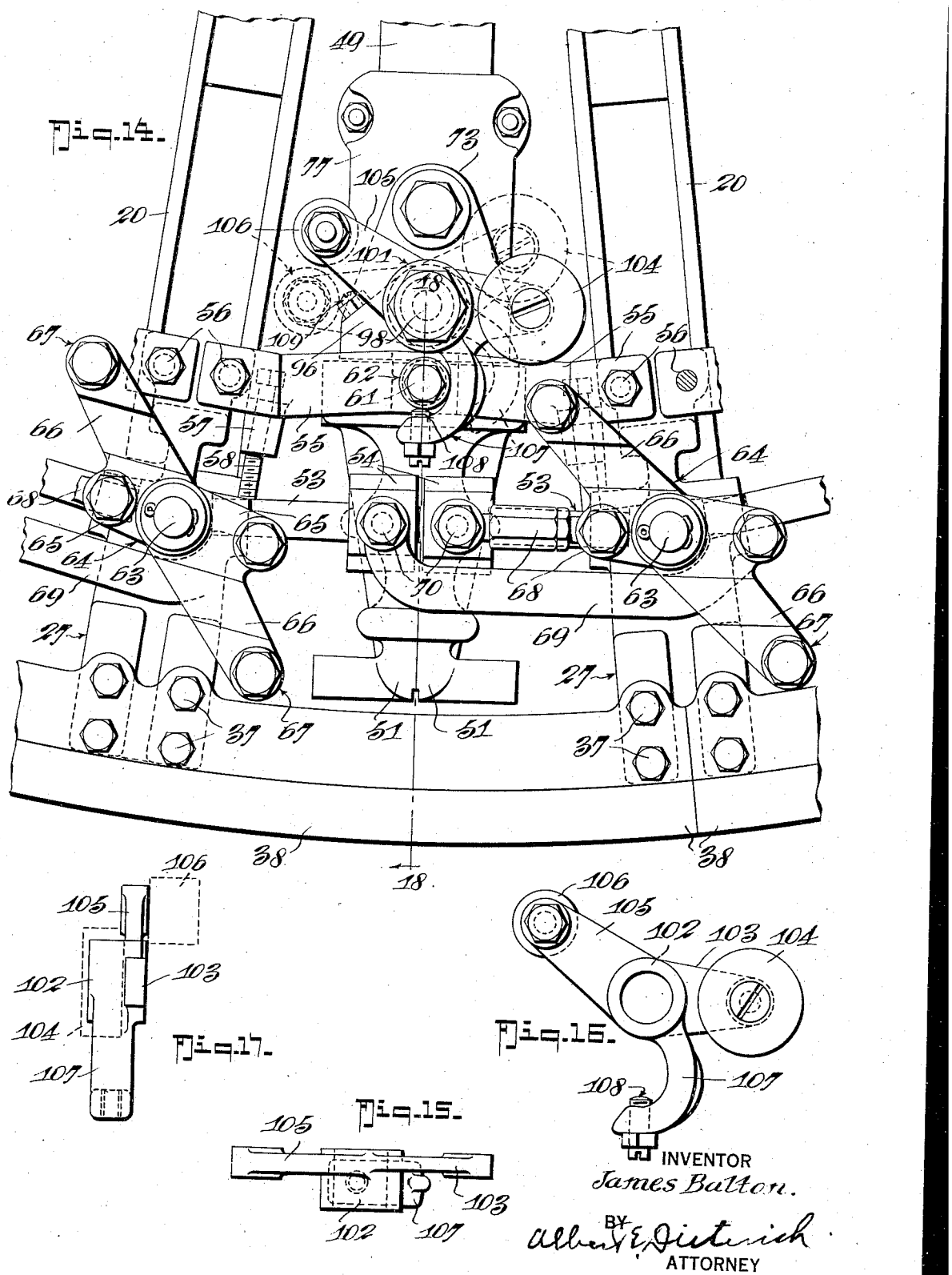

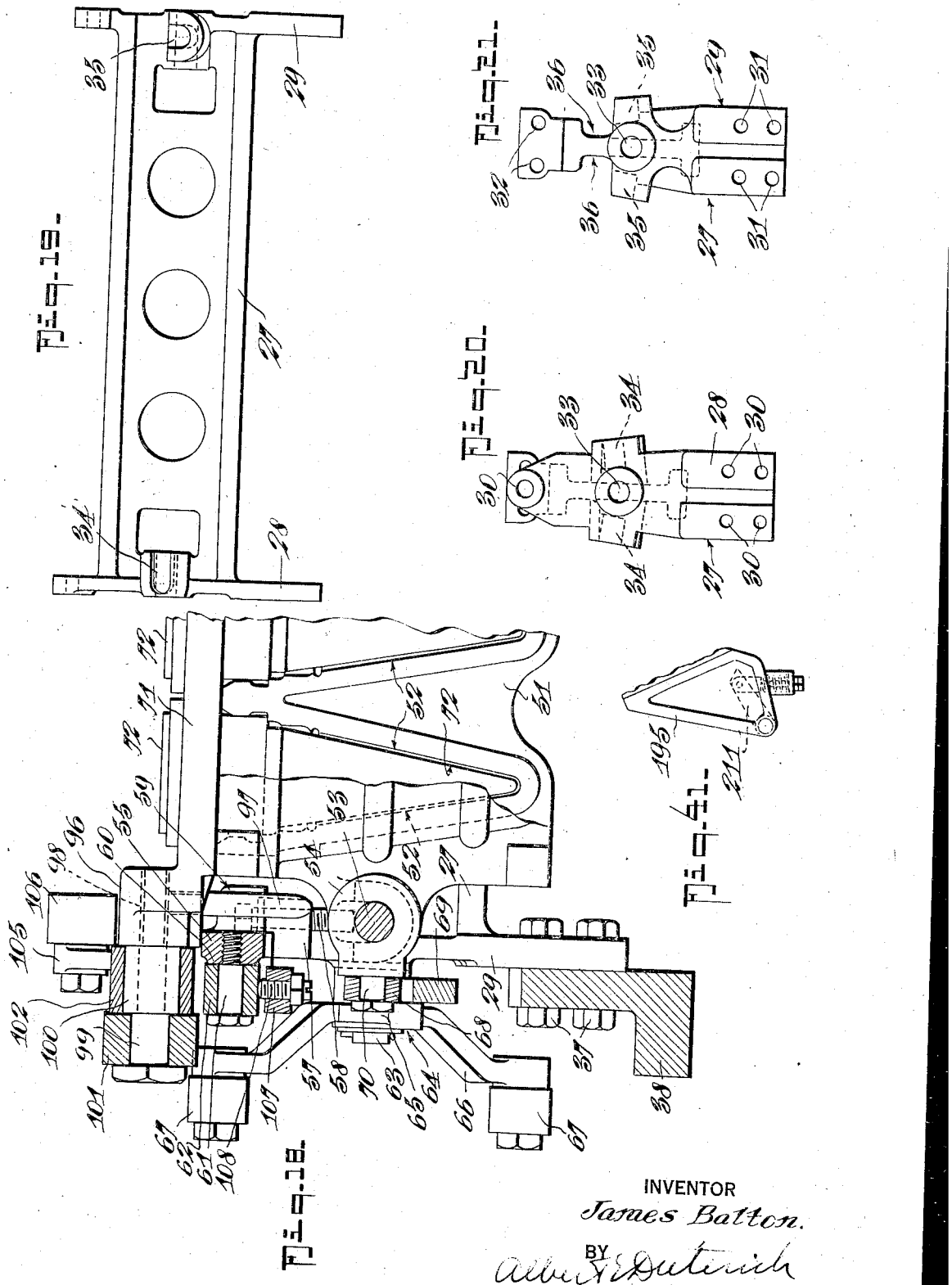

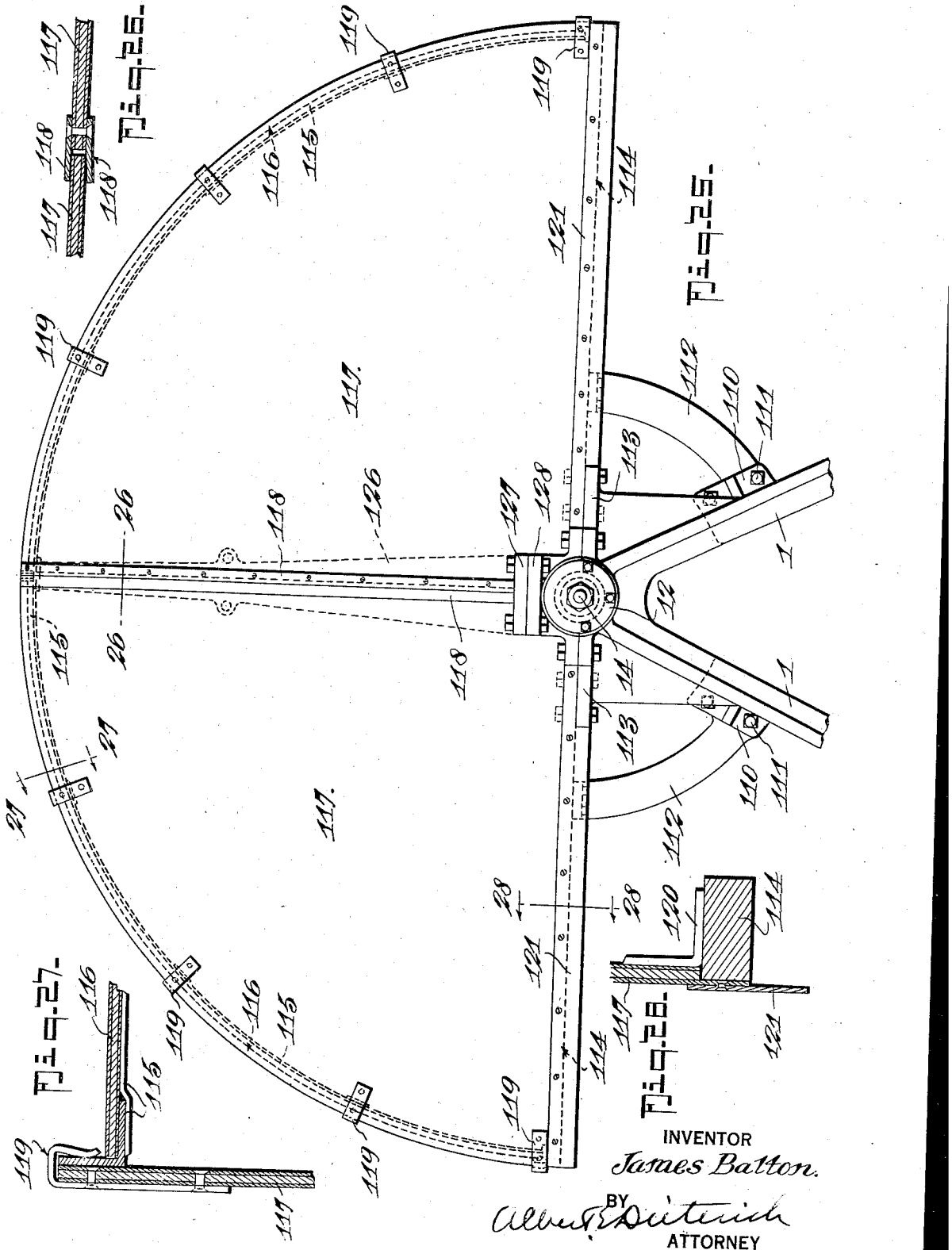

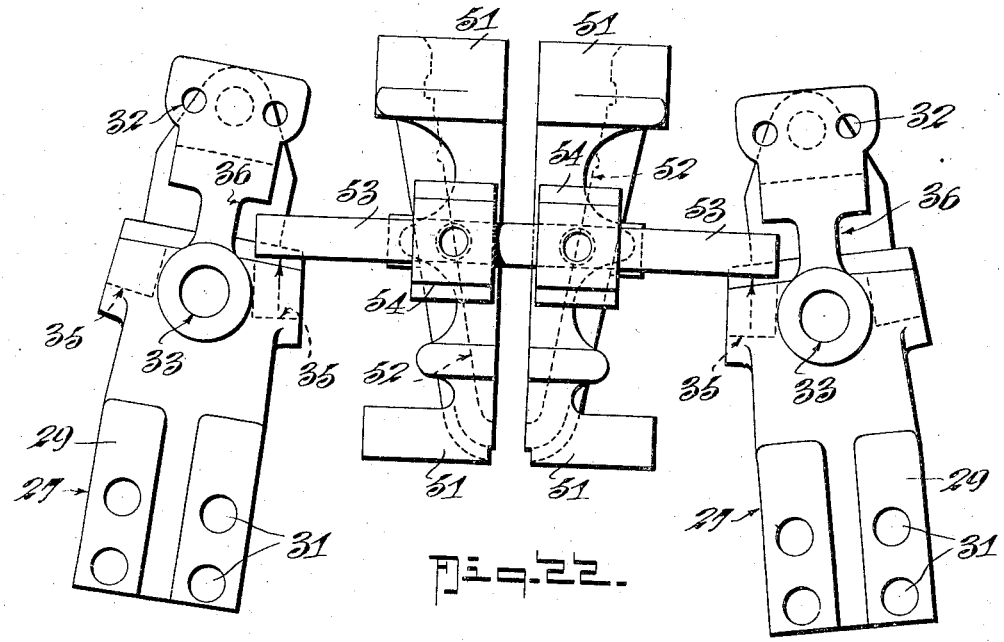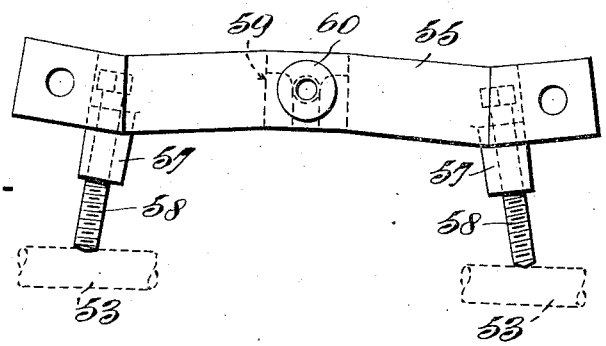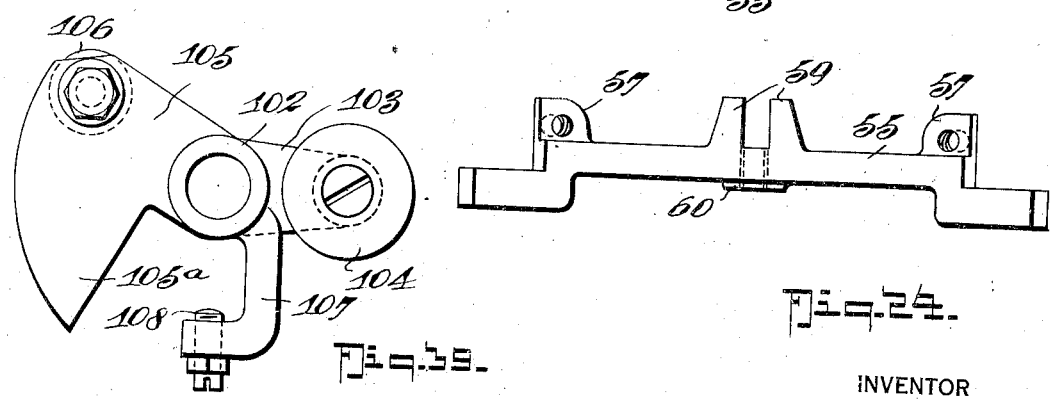

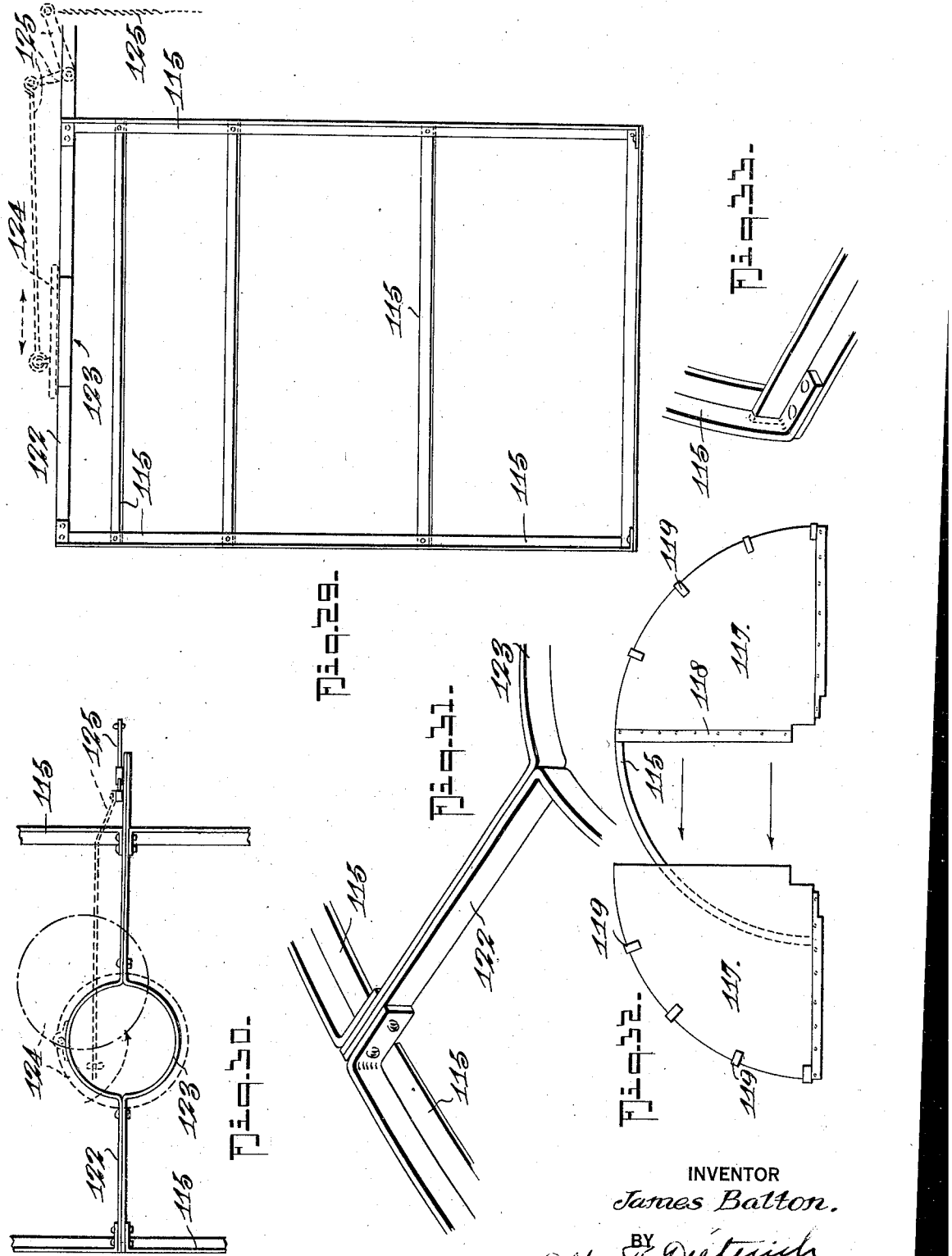

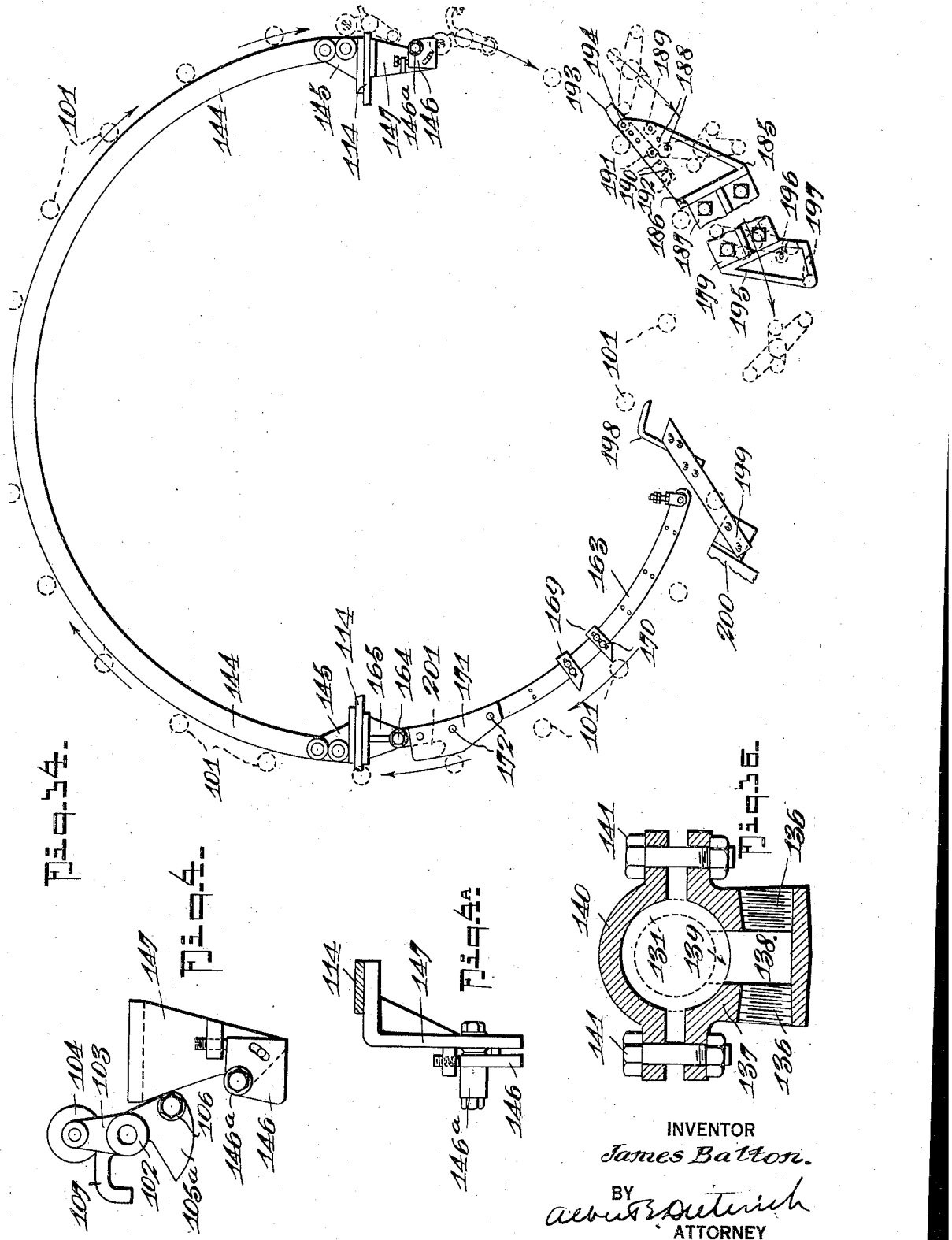

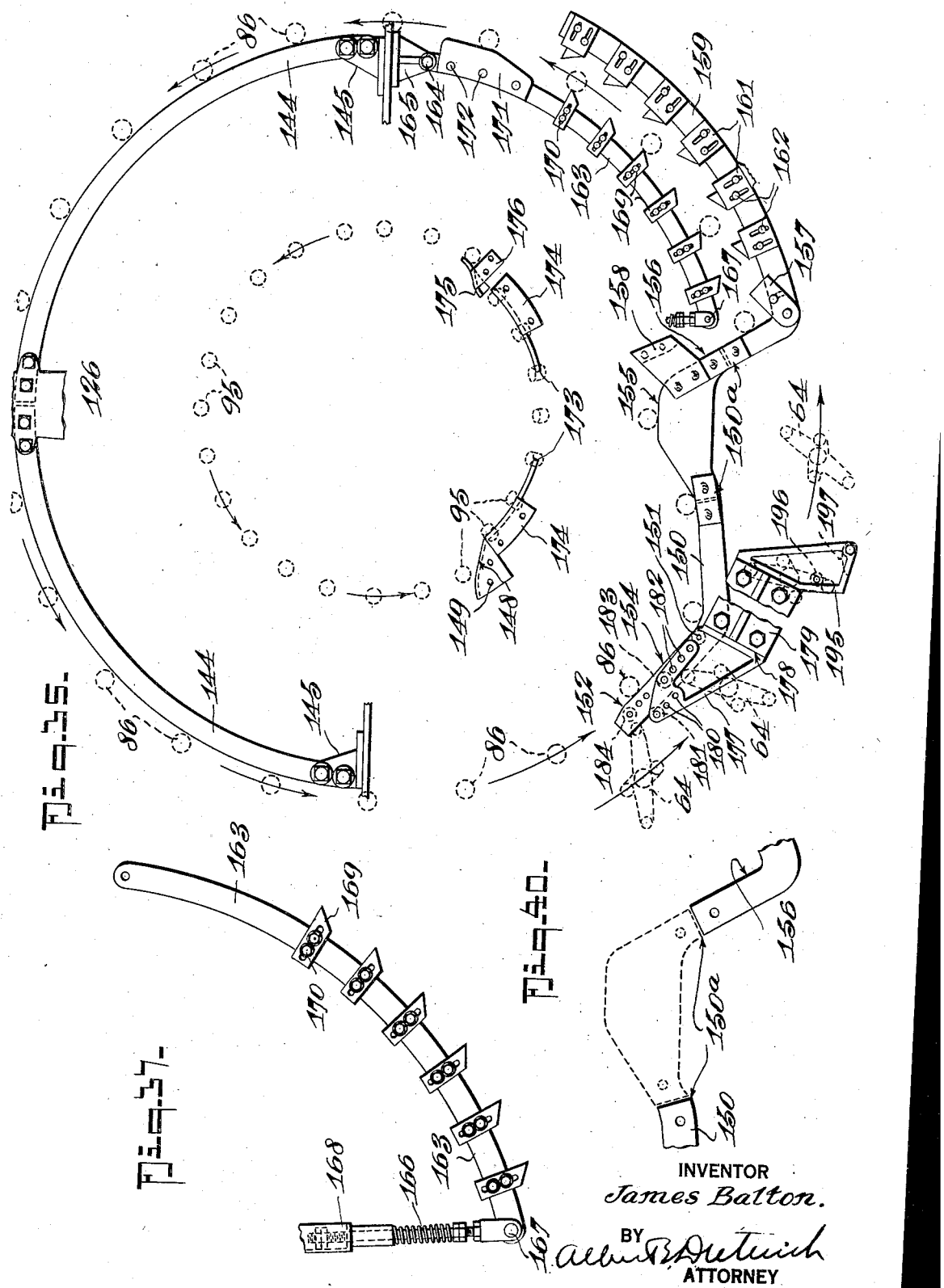

Patented Aug. 12, 1930

1,772,450

UNITED STATES PATENT OFFICE

JAMES BALTON, OF BALTIMORE, MARYLAND, ASSIGNOR TO JOSEPH SHAPIRO, OF BALTIMORE, MARYLAND

AUTOMATIC CUP-PASTRY-MAKING MACHINE

Application filed May 27, 1929. Serial No. 366,411.

The invention generally relates to pastry making machines, particularly those of the broadly termed Bruckman type in which the loading, molding, baking, extracting and trimming operations are all automatically conducted in a manner eliminating all need for handling the material or finished product during the course of manufacture, and the said invention primarily has for its object to provide a new and improved machine structure of the continuously rotating Ferris wheel form which is notably simple in construction and easy to assemble and which embodies marked advantages of compactness and balance, minimizing wear and strain and materially diminishing the amount of floor space necessary to be occupied, and the amount of power necessary to be consumed in assuring efficient operation.

Among the more detailed objects of the invention is included that of providing a machine which is of the Ferris wheel type (wheel of mold units rotatable in a vertical plane about a horizontal axis) and yet is so constructed as to permit of efficient employment of stationary burners for heating both the male and female mold elements. A novel means for mounting the burners and for providing a gas mixture supply manifold is also comprehended.

Another object of the invention is to provide a wheel structure which is novel in its construction and in its mounting, a novel spacer and hollow shaft equipment also being provided and there being only two wearing bearings which are so positioned and protected as not to be subjected to the intense heat within the oven. The wheel includes a single side hub supporting radially disposed equi-distantly spaced spokes which carry the female mold carriers, thus constituting a sort of open front wheel, the carriers comprising an annulus of spaced members. The carriers are joined at the rear side by a gear ring through which rotation is imparted to the wheel, and at the front side by a solid bearing ring. In this manner the weight of the wheel is principally carried on the one side hub or plate, the front ring, which rides on anti-friction supporting rollers, serving to overcome any tendencies of the wheel to twist in its mountings. The ring gear and front ring also act as spoke spacers.

Another object is to provide a novel mounting for the female mold units, enabling them to be removed and replaced with great facility. Means to mount and dismount the core bars with equal facility is also provided.

The invention still further resides in so constructing and arranging the constituent parts of the machine that the parts most liable to wear and breakage are positioned in the most accessible places and are so constructed and mounted as to enable their removal and replacement with a minimum of labor and expense.

Another feature of the invention resides in the construction and mounting of the core bars, enabling free seating of the cores or male elements under all working conditions and assuring against inaccuracies due to inefficient cooperation of the male and female molding elements of particular units under varying conditions of operation.

Another object of the invention is to provide novel core bar locks at each end of the core bars, doing away with the necessity of continuous locking or hold-down tracks, double core cracking cams being employed to equalize the strain of freeing the cores from the baked products, the strain being equally distributed to both ends of the core bars. In addition, safety rails are provided to assure against falling of the core bars should breakage occur.

Another object of the invention is to provide a novel core bar lift and lowering track including an adjustable discharge end enabling proper seating of the cores regardless of batter condition during a particular running.

Another object of the invention is to provide a novel squeeze or steam escape track which is yieldably-pivotally mounted and carries a plurality of adjustably spaced teetering cam units adjustable to suit particular running conditions.

Still another object of the invention is to provide a novel oven structure assuring maximum heat retention and proper combustion, the said oven being formed of peculiarly constructed and arranged sections removable for rendering working parts readily accessible.

With the above and other objects in view that will hereinafter appear, the invention still further resides in the novel details of construction, combination and arrangement of parts, all of which will be first fully described in the following detailed description, then be particularly pointed out in the appended claims, reference being had to the accompanying drawings, in which:

Figure 1 is a rear face view of the machine complete.

Figures 2ª and 2ᵇ compositely comprise a front face view of the machine, the upper portion of the wheel and oven being broken away.

Figure 3 is a central vertical cross section of the machine.

Figure 4 is an inside face view of the front core lock unlocking cam.

Figure 4ª is an edge view of the front core lock unlocking cam.

Figure 5 is a front face view of the wheel hub plate with a portion of the complement of the main and auxiliary spokes attached thereto, some of the spokes being removed for purposes of illustration and others being partially broken away.

Figure 6 is a horizontal section of the hub plate, the section being incomplete at one side.

Figure 7 is a detail cross section illustrating one female mold unit and the mountings for the same and for the core bar, the core bar proper and the mold unit securing tie bar and toggles being omitted for purposes of illustration.

Figure 8 is a detail horizontal section taken on the line 8—8 on Figure 7.

Figure 9 is a detail cross section which, when matched at line A—B with Figure 7, forms a continuation of the latter and illustrates the rear core lock or core bar standard locking means.

Figure 10 is a rear face view of the parts shown in Figure 9.

Figure 11 is a rear face view of the parts shown in Figure 7, parts being broken away and in section, the female mold toggles also being shown.

Figures 12 and 13 are face and edge views respectively of one of the female mold toggle levers.

Figure 14 is a front face view illustrating one molding and baking unit in the female mold and core locked or baking condition, the unlocked position of the front core bar lock being shown in dot and dash lines.

Figures 15, 16 and 17 are plan, face and end views respectively of one of the front core bar locks.

Figure 18 is a detail vertical cross section taken through the front end of one molding and baking unit, the section being taken on the line 18—18 on Figure 14.

Figures 19, 20 and 21 are side and opposite end views respectively of one of the female mold supports.

Figure 22 is a somewhat diagrammatic front elevation illustrating a female mold unit and its associated supports, the manner of removably mounting the unit being clearly shown.

Figures 23 and 24 are face and plan views respectively of one of the female mold unit securing tie bars.

Figure 25 is a detail face view of the oven and its mounting.

Figures 26, 27 and 28 are detail cross sections taken on the lines 26—26, 27—27 and 28—28 respectively on Figure 25.

Figure 29 is an end view of the oven frame.

Figure 30 is a detail plan view of a portion of the oven frame, the up-draught control gate operation being diagrammatically illustrated.

Figure 31 is a diagrammatic face view of one side of the frame portion shown in Figure 30.

Figure 32 is a diagrammatic face view of the oven and illustrating the manner of removing one of the quarter sections.

Figure 33 is a detail perspective view of one of the oven frame end corners.

Figure 34 is a diagrammatic face view of the actuating and safety trackage at the front side of the machine.

Figure 35 is a view similar to Figure 34 and illustrates the trackage at the rear side of the machine.

Figure 36 is a detail view illustrating one of the burner tube mounting clamps.

Figure 37 is an enlarged detail view illustrating the steam escape track section at the rear of the machine.

Figure 38 is a detail perspective view of one of the cam units of the track section shown in Figure 37.

Figure 39 is a detail view illustrating a modified form of front core bar lock.

Figure 40 is a detail view of the core bar elevating and lowering cam track.

Figure 41 is a detail view showing a yielding cam 211 which may be used in place of the rigid cam 197.

My improved machine is of the Ferris wheel type in which the molding and baking units are supported on the rim of a large wheel which is rotatable in a vertical plane about a horizontal axis mounted in suitable frame standards. One of the features of the invention resides in its small and compact nature, and looking toward this end I have seen fit to employ twenty-four molding units of five cavities each arranged in equi-distantly spaced relation about the rim of the wheel. It is to be understood, of course, that the dimensions of the wheel, and the number of units and cavities may be varied without departing from the scope of the invention.

The framing which supports the wheel includes an opposed pair of A frames 1 and 2, the front frame being designated 1 and the rear frame 2. Each frame includes a base web 4, and through the medium of its base web each frame is supported upon a pair of base rests 5. The rear frame also has an intermediate cross web 3. The base rests, arranged in opposed end pairs, may be secured together in suitable spaced relation by spacer rods 6, and the base webs 4 may be secured together by a suitable cross frame beam 7.

The frame units 1 and 2 are each equipped at its apex with a horizontal bore bearing 8 and these bearings are arranged in axial alignment to rotatably receive the wheel axle 9 which is in the nature of a hollow shaft. It will be observed by reference to Figure 3 of the drawings that the bearings 8 are so constructed and arranged as to be disposed laterally of the front and rear confines of the oven so as not to be subjected to the intense heat within the oven.

A spacer rod 10 passes through the hollow shaft axle 9 and includes reduced and threaded shanks 11 which extend through the bearings 8 and through abutment plates 12 which are secured as at 13 to the outer faces of the said bearings. The body portion of the rod 10 between the shoulders formed by the reduced shanks is of a length slightly in excess of the length of the axle 9 so that when the securing nuts 14 are tightened against the plates 12 the rod will serve to rigidly secure the upper ends of the A frames in proper spaced relation without danger of binding engagement of the rotatable axle 9 in its bearings or against the plates 12. See Figures 1 and 3.

A simple hub plate 15 is provided and includes a main flat body rotatable in a vertical plane and a mounting sleeve 16 which is secured by set screws or in any other approved manner upon the axle 9 with the said body adjacent the rear frame unit 2. The hub plate also includes a number of equi-distantly spaced strengthening webs 17 and may also be provided with facing pads 18 and suitable positioned bolt holes 19 to facilitate proper mounting of the wheel spokes 20 which extend radially from the said plate to provide supports for the molding and baking units. See Figures 5 and 6.

Each spoke carries a mold carrier or supporting member at its free end, and as each such unit is supported by and between each adjacent pair of supporting members, and as there are twenty-four such units, it follows that twenty-four spokes are provided. Each spoke includes a mounting head 21 which is secured to the hub plate by bolts 22 which pass therethrough, and by bolts 23 which pass between adjacent pairs of spokes as indicated in Figure 5 of the drawings. These latter bolts, however, perform an additional function, as will be observed by reference to Figure 9 of the drawings, which will be described hereinafter.

At its outer end each spoke 20 has secured thereto, by machine screws or bolts 26, a female mold supporting member or carrier 27. The carriers 27 project forwardly and horizontally and constitute a wheel rim composed of equi-distantly spaced members. The mounting of these carriers is clearly illustrated in Figures 7 and 11, and the detailed construction thereof will be readily apparent by reference to Figures 19 to 22 inclusive.

Each carrier 27 includes a main web body of I-beam shape in cross section and has a mounting head 28 at the rear end by which it is attached to the respective spoke, and a similar mounting head 29 at the front end, the purpose of which will be described later. The rear head 28 is equipped with five bolt apertures 30 to receive the screws 26, and the front head 29 is equipped with outer apertures 31 and inner apertures 32, the purpose of which will be described later. Each head is also provided with a threaded tap 33, the said taps being axially aligned and provided for a purpose that will also be apparent as the description progresses.

It will also be observed by reference to the Figures 7 and 9 referred to that each carrier has rear horizontally disposed mounting rod receiving slots 34 and forward vertically disposed rod receiving slots 35, the rear slot being open at its forward end and the forward slot being open in the upward direction or toward the center of the wheel. The purposes of the structural features mentioned, and also the reason for providing the front heads with recesses or cut-outs 36 just above the front slots 35 will be discussed later.

Through the medium of bolts 37 passed therethrough and through the outer apertures 31 in the heads 29, bearing ring segments 38 are secured to the front ends of the carriers 27. See Figures 2, 3 and 7. These segments are struck on arcs having the wheel axis as their common center and eight such segments conjointly form a complete ring which rolls on suitably positioned anti-frictio rollers 39, one of which is supported as at 40 by the front frame 1 at the discharge end of the machine, and another being supported as at 41 upon a cross beam 42 which joins the frames 1 and 2 at the opposite end of the machine.

The forwardly extended ring of carriers 27 causes the center of gravity of the wheel to be thrown forwardly out of the plane of rotation of the hub plate body and spokes and occasions a tendency for the wheel to cant or twist on its axle. This unbalanced weight is supported by the ring and roller equipment and the tendency which would otherwise cause undue strain and uneven bearing wear, and possibly wobbling of the wheel, is effectively controlled.

In addition to its weight supporting function, the ring 38 also serves to rigidly secure the carrier front ends in equi-distantly spaced relation.

Gear segments 43, secured at 44 to the rear heads 28 of the carriers 27 and to the spoke ends, serve to similarly secure and space the carrier rear ends and the spokes, and through the ring gear thus formed continuous rotation is imparted to the wheel by a driver pinion 45 secured on the cross shaft 46 which is in turn rotated through power transmitting devices 47 by the motor 48. See Figures 1 and 3.

Twenty-four auxiliary spokes or slide guide standards 49 are also provided and one thereof is mounted to the rear of and centrally between each adjacent pair of wheel spokes 20. See Figures 3, 7, 9, 10 and 11. These standards are secured at their inner ends to the rear face of the hub plate body 15 through the medium of the bolts 23, and at their outer ends to the ring gear 43 through the medium of the bolts 50. The purpose for the standards will become apparent as the description progresses.

In order to add strength to the wheel and to distribute the strain of rotation of such heavy equipment as must be employed in such machines, I extend each fourth spoke 49 as indicated in Figure 9. These spoke extensions are secured by bolts 25 to the main flat body of the hub plate 15, a suitable ring pad 24 being formed on the rear face of that body for their extended ends to bear against, and serve to more evenly distribute to the hub plate the strains set up by the rotation of the wheel and the weight of the parts carried thereby.

The parts thus far described comprise the wheel proper, the means for rotatably supporting it and the means for imparting rotation thereto. Other parts are of course carried by the wheel but these parts comprise molding agencies and their operating connections and are not a part of the wheel proper since they may be readily removed and replaced with similar equipments of different design. For example, torch cone units may be substituted for true cone units or for brick cream receiving cup units.

The mold units, their operating connections, the charging mechanism, the trimming mechanism and the oven structure will be described below.

Each female mold comprises a pair of mold halves 51 having matching mold cavities 52 in their opposing faces and being adapted to move toward and from each other at times with their faces parallel on slide rods 53, the said mold halves being provided with extended bearing heads 54 apertured to slidably receive the said rods.

The extended ends of the slide rods are mountable in receiving sockets provided therefor in the carrier members 27. The rod extensions at the rear ends of each mold unit seat in the horizontal seats 34 provided in the carrier heads 27 and the rod extensions at the front end of each mold unit seat in the vertical seats 35 with which the said carriers 27 are provided. Thus it is possible to lift the front end of a selected female mold unit out of the front seats 35 in the manner illustrated in Figure 22 of the drawings when, by moving the mold unit forwardly, the front rod ends passing through the cutout portions 36 with which the said carriers 27 are provided and the rear rod ends moving freely out of the rear seats or sockets 34. See Figures 14, 18 and 19–21.

A tie bar or bridge member 55 is associated with each mold unit and is secured by screws 56 which enter the taps 32 provided in the carrier heads 27, each said tie bar being equipped with extension bosses 57 having threaded taps for receiving securing screws 58 which engage the front rod ends and removably secure the mold units in position on the carriers. Since the rear rod ends are not free to move upwardly in the sockets 34 this simple hold-down means provided at the front ends of the female mold units comprises the only means necessary to secure the same in position on the machine and when it is desired to replace the said units, because of breakage or a desire to use molds having differently shaped cavities, it is only necessary to remove the two screws 58 securing the respective mold, together with the operating links which connect with the head extensions 54 of the mold halves, in order to enable quick and easy removal of the said mold unit.

By reason of the fact that the tie bars are shouldered at their ends as illustrated in Figure 24, the tie bars also serve effectively as spacers for the upper ends of the carriers 27 and relieve shearing strain that would otherwise be directed against the securing screws 56. Each tie bar also carries spaced guide lugs 59 and is equipped at its outer face with a reinforced boss 60 thread-tapped to receive a screw 61 which mounts a core bar front lock roller 62, the purpose of which will later be apparent.

A bearing stud 63 is secured in each tap 33 provided in the carriers 27 and on each stud a rocker arm 64 is mounted, a washer and cotter pin serving to secure the arm upon the said stud in a manner enabling quick removal. Each arm is equipped with actuator lug extensions 65 and has its ends extended and offset as at 66 and equipped with cam engaging rollers 67. See Figures 11–14 and 18.

Each arm 64 has one of its lugs 65 link-connected at 68 to an adjacent mold half and the other lug 65 link-connected at 69 to the associated or other mold half, the said links being secured as at 70 to the mold lugs or bearing head extensions 54. It should be understood that the same mold actuating rocker arm and link connections are provided at both faces of the machine, or in other words, at both ends of the female mold units.

Cooperative with each female mold unit or pair of mold halves is a core bar 71 and each said core bar carries a number of cores 72 equivalent to the number of cavities provided in the said unit and positioned for centering in the said cavities when the parts are brought into cooperating or baking association. Each core bar is provided with an upstanding rear end lug 73 which is apertured as at 74 and carries rear lug extensions 75 by which the core bar is pivotally mounted as at 76 upon a slide block or carrier 77 slidable on one of the auxiliary spokes 49 hereinbefore referred to.

A screw stud 78 is adjustably secured as at 79 upon each block 77 and passes freely through the aperture 74 of the associated core bar lug 73 and is secured in its adjusted relation in the block tap by a jam nut 80, clamp nuts 81 mounted thereon serving in conjunction with the screw head 82 to provide a freedom or pivotal play indicated at 83 and serving to assure proper seating of the cores under all running conditions of the machine.

A core slide bar or standard 84 is secured at 85 to each slide block 77 and has a rear core roller 86 secured thereto as at 87 for a purpose that will later be apparent. The upper end of each standard 84 passes through a guide 88 carried by a bracket head 89 secured on the respective auxiliary spoke 49 by the same bolts 23 which secure the said spoke to position. At its end, where it extends beyond the guide 88, each standard 84 is equipped with an adjustable set screw 90 serving as a lock lug capable of having its position varied to suit its requirements of use and to compensate for wear. Each screw 90 is adapted to be engaged by a lock roller 91 which constitutes a rear core lock and which is carried by one arm of a bell crank 92 pivoted at 93 in bracket ears 94 which, together with the bell crank, are arranged to straddle the standard 84. The other arm of each bell crank carries another core lock roller 95 which is engaged in a manner that will be described later to move the said rear core locking device into and out of locking engagement with the lock screw 90. See Figures 7-10. Each core bar is also equipped with an enlarged head 96 at its front end from which depends a guide pin 97 adapted to enter between the tie bar lugs 59 for the purpose of centering the free end of the core bar and assuring accurate seating of the cores in the mold cavities at all times. Each head 96 is provided with a threaded tap to receive a screw 98 having an enlarged head shank 99 which forms a shoulder to enable clamping of a sleeve 100 in suitable position on the said head, and the shank portion 99 of the screw serves as a mounting for the front core roller 101.

A core lock rocker member 102 is rotatably mounted on each sleeve 100 and is equipped with an arm extension 103 which in turn carries a front core locking roller 104, and another arm extension 105 that carries a front core unlocking roller 106. Each member 102 is also equipped with a curved arm extension 107 which carries an adjustable lock screw 108 in position for locking under the tie bar carried lock roller 62 as indicated in Figures 14 and 18 of the drawings to lock the front end of the core bar against any tendency to move upwardly away from the mold halves. Each head 96 also carries an adjustable keeper screw 109 which, when the rocker member 102 is forced to the unlocked position illustrated in dot and dash lines in Figure 14, so engages the roller 106 that it releasably holds the rocker member in the unlocked position referred to.

Just above I have described the male and female molding devices, and the parts for operating them or moving them toward and from operative positions (means other than cams and cam trackways are referred to here), it being evident that when the rocker arms 66 are rocked on their centers they will cause the links to move the mold halves toward or from each other as the case may be and when in their normal positions illustrated in Figure 14 of the drawings will serve to lock the said mold halves against inadvertent opening. Means have also been described for locking the core bars in the baking condition at both front and rear ends, means also being provided for slide-guiding the core bars in their movement into and out of the mold at two more or less remote points assuring ease of operation and avoidance of the tendencies to bind.

To the bearing pads 110 with which each side A-frame is provided are secured, as at 111, arcuate supporting members 112 which serve, with the frame heads 113, to support horizontal rest bars 114 forming a frame which carries a half circular skeleton frame or superstructure 115 composed of angle irons and cross straps. See Figures 25-33. In practice this frame is covered by arcuate removable top sections 116 of asbestos and the sides of the said frame are covered by side quarter sections 117 which are removable as indicated in Figure 32 of the drawings. The sections 117 are provided with medial flap extension plates 118, the plates being carried by one of the said sections and serving as a receiving groove for the abutting edge of other sections. These sections are also equipped with overhanging hooks 119 which overlie the frame angles as indicated in Figure 27 of the drawings to removably secure the plates in operative position, and the said sections may also be provided with rest feet 120 to rest upon the bars 114, and depending flanges 121 for extending beyond the said bars as indicated in Figure 28.

At its upper center the frame 115 is provided with a cross member 122 shaped intermediately of its ends to form an updraft opening 123 which may be covered by a pivoted damper plate 124 movable through suitable devices 125 from a remote point beside the machine to enable control of draft upwardly through the oven and for assuring proper combustion.

Slide frame extension uprights 126 may be provided and supported at 127 on the apex heads 128 of the A-frame to aid in supporting the oven and the burners and safety rails to be described hereinafter.

A pipe line 129 is provided for supplying a suitably controlled air and gas mixture and the said line is connected with a vertical manifold 130 which in turn delivers into upper and lower cross manifolds 131. Arcuate core heating burner pipes are provided and are positioned concentric to the axis of the wheel and in position for heating the cores and mold units, one series of pipes 132 being positioned within the circle of cores and the other series of pipes 133 being positioned outwardly beyond the circle of mold units for effectively heating them. The pipes 132 and 133 carry inwardly directed individual burner heads 134 and are closed at their lower ends as at 135. The other ends of the pipes 132, 133 are threaded at 136 into individual clamp heads 137 each of which is formed in two separable parts, the said pipe ends communicating in a receiving pocket 138 in one of the clamp head parts, the said pocket being in turn adapted to receive the gas mixture through a registering opening 139 formed in the cross manifold 131. The other piece of the clamping head is indicated at 140 and each is adapted to be secured to its accompanying head piece by securing bolts 141.

The cross manifolds may be suitably supported at 142 and the free ends of the pipes 132, 133 may be steadied by being secured to cross braces 143 supported by the rest bars 114. A safety track 144 is provided at each side of the machine, being supported by brackets 145 carried by the rest bars 114 and bearing concentric relation to the axis of the wheel. These tracks are in position for receiving the core rollers 86 and 101 at any time breakage should occur so that the cores and core bars may be suitably supported against falling down into and damaging other parts of the machine. The core bar rollers do not normally engage the tracks 144, the said track serving only as safety tracks as just explained.

A front core unlocking cam 146 is provided and is in the nature of a pivotally adjustable stationary plate supported by a bracket 147 secured to the adjacent bar 114 and in position for engaging the front core unlocking roller 106 just as the particular unit which carries said roller is leaving the oven on its way to the product discharging station. This cam may carry a roller 146ª to effect initial contact and serves to rock the front core lock from the position illustrated in full lines in Figure 14 to the position illustrated in dot and dash lines in the said figure, unlocking the front end of the core bar so that when suitable trackage is engaged the core bar and cores may be lifted out of cooperative relation with the mold cavities. See Figures 2, 2ª, 4 and 4ª. A rear core lock cam 148 is also provided and is in the nature of a curved track section secured as at 149 to the advance one of the rear arcuate support members 112 and this cam serves to engage the rear lock roller 91 to move it in a manner for releasing the lock roller 91 from engagement with the lock screw 90.

A core bar track 150 is provided and is supported as at 151 upon the rear A-frame in position for engaging the rear core rollers 86 carried by the core bar standards 84. This core track 150 includes a receiving nose leading to a crest 152 which serves to primarily lift a respective core bar approximately three quarters of an inch above the top face of the mold halves. From the crest the track again recedes in a manner for again lowering the cores about three eights of an inch so that they move back into the molded product to assist in steadying and guiding the same during the discharging act. After the receding period, the core track has a concentric dwell portion 154 which extends over approximately the distance of one wheel station from where it rises at 155 to againt reach a crest suitably elevated to assure lifting the core bars over the batter pump or charging mechanism that will be referred to again hereinafter. From the crest at the mold charging station, approximately at the vertical center of the machine, the core track turns relatively downwardly as at 156 to effect a lowering of the cores again into the mold cavities. It is desired that the cores be not lowered all the way to their finally seated position but that they be retained at approximately one-eighth of an inch from full seating position so as to allow a period of steam escape and for this purpose the delivery end of the core track is provided with an adjustable foot plate 157 which may be adjusted to vary the degree to which the core track lowers the core bar. A safety track portion 158 follows the lowering portion of the cam track in suitable position thereabove to act as a safety means for assuring that the core bars follow down the lowering trackway and overcoming any possible tendencies of the cores to stick and fail to come into register for entering the teetering device at the proper time. This safety track portion is so positioned relatively to the line of movement of the core bars as to effect its active function when called upon without shock or strain upon the core bars or their mounting agencies.
The lift-crest or central portion of the core track 150 may be removably secured to the remainder or entrance and delivery ends of the said track as indicated at 150ª, see Figure 40, so that it can be removed to facilitate adjustment or levelling of the core bars. In this manner the core track portion can be removed to enable lowering of any given core bar onto its associated female mold at the bottom center of the wheel, where the action of gravity is centered and it is possible to adjust the position of the core bar in the most convenient manner.

At its end the core track delivers onto a stationary teeter arc segment 159 which is supported upon a bracket 160 carried by the adjacent A-frame leg and the said segment serves to carry a plurality of spaced teeter cams 161 which are individually secured upon the said segment by a slot and bolt connection 162 so that their positions may be varied to suit varied running conditions of the machine.

An upper yieldable presser track arc segment 163 is also provided and is pivoted at its upper end as at 164 upon a bracket 165 supported by the respective rest 114, the free end of the said segment being pressed toward the periphery of the wheel or toward the core bars by a spring rod 166 pivoted as at 167 to the said segment and passing through an opening in a bracket 168 in a manner for always urging the said segment's free end toward the core bars. The segment 163 is provided with a plurality of press-down teeth 169 each of which is adjustably mounted on the said segment as at 170 and positioned intermittently of an adjacent pair of lower segment cams 161. Obviously the cams 161 and teeth 169 serve to engage the core rollers 86 to impart a teetering movement to the core bars and assure proper steam escape and gradual seating of the cores. To effect the final seating of the cores the segment 163 carries a core seating cam 171 which is in the nature of a cam plate secured as at 172 to the said segment. It should be here understood that the parts 163—172 are duplicated at both sides of the machine so as to act on both the front and rear ends of the core bars. It will be noted, however, that the front segment 163 carries a few only of the press-down teeth 169 and these serve more or less as safety devices to assure proper seating of the front ends of the cores since it will be understood that the nearer the auxiliary spokes approach the horizontal the less will gravity aid in the seating of the cores in the mold cavities and necessitate the employment of mechanical seating devices.

After being unlocked the rear core lugs are held to their unlocked position by reason of engagement of the lock rollers 95 with a holder track 173 which is supported at 174 on the rear A-frame and delivers onto the rear core locking cam section 175 which is supported as at 176 and acts similarly to but reversely of the operation of the unlocking cam 149 hereinbefore described.

It will be observed that the advance end of the core track is secured at 151 on a special bracket 177 having an offset head 178 which is secured to the adjacent A-frame pad 179. The special bracket 177 is provided with a plurality of selective apertures 180 to enable adjustable mounting of the rear mold cracking cam which is in the nature of a roller 181, and an associated series of selective apertures 182 for adjustably mounting the rear mold opening roller 183. The rear cracking roller is positioned in the path of the advance or inner rocker arm carried roller 67 and serves to start cracking or partially opening them, the said roller 167 then riding over the top of the roller 181 and coming into contact with the opening roller 183 which completes the movement of the respective rocker arm and the opening or separation of the mold halves. Each series of selective apertures 180 or 182 are positioned equal distances from the axis of the wheel and serve as selective mountings enabling cracking and opening of the mold at different points.

It will be observed that the advance end of the core track is also provided with a series of apertures to provide a similar selective adjustable mounting for a safety roller 184 which is so positioned relatively to the cracking roller 181 as to prevent undesired back lash or excessive movement of the respective rocker arm by reason of engagement with the cracking roller.

At the front side of the machine a similar bracket 185 is provided and has its offset head 186 similarly secured to the adjacent A-frame pad 187, and this bracket is also equipped with sleeve mounting apertures 188 to form an adjustable mounting for the front mold cracking roller 189 and other selective apertures 190 for selectively receiving the front mold opening cam 191. It will be understood, of course, that the front mold cracking and opening rollers 189 and 191 are positioned in transverse alignment with the rear mold cracking and opening rollers so as to be active simultaneously therewith.

The bracket 185 is also equipped with laterally or inwardly extended lugs 192 to which the front core cracking cam nose 193 is secured. This cam nose 193 is positioned transversely opposite the receiving nose of the rear core track and serves to break the core bars loose at the front end and thus relieve the strain that would otherwise be occasioned when freeing the cores from the molds. Thus the strain of freeing the cores from the molds is distributed equally throughout the length of the core bar and since this is the only point at which such strain would be distributed to the front end of the core bar the nose 193 is short and terminates in function immediately after cracking the cores free at the front end as just described.

The front bracket 185 is also equipped with a series of adjustment apertures to selectively receive the safety roller 194 which prevents back lash or overthrow of the respective mold-halves-operating rocker arms at the front of the machine.

At transverse opposite points front and rear brackets 195 are secured by offset heads to the rear portions of the frame pads 179, 187 and each such bracket carries a mold closure starting roller 196 and a mold closure completing cam 197. The rollers and cams 196, 197 respectively are positioned for engaging the outermost rocker arm carried rollers 67 which, after having been moved to the mold opening position by the mold cracking and opening cam rollers, are now the advancing rollers. The starting rollers first engage the said rollers 67 and move them to partially close the molds, after which the said rollers ride over the starting rollers and engage the closing cams proper 197 to complete the closing of the molds. By reason of the arrangement of the toggle links which connect the rocker arms with the mold halves when the mold halves are closed to the positions illustrated in full lines in Figures 11 and 14 of the drawings they will automatically lock in that condition until the rocker arms are engaged by the cracking and opening cam rollers.

A safety cam 198 is located at the front side of the machine in a position to be engaged by any of the front core locking rollers 104 which may be out of normal unlocked position. Any front core locks which have become moved from their normal unlocked position would not be in proper position to pass through the remaining mechanism of the machine and be properly relocked, hence the provision of the cam 198 which ensures restoration of any of the locking cams which have become displaced in passing from the discharging station to the baking station. The cam 198 is supported as at 199 upon the front A-frame pad 200.

As will be observed by reference to Figure 39 the front core bar locks may have their arms 105 counterweighted as indicated at 105ª to further assure proper positioning of the said locks while approaching the front core locking cam. The counterweighted portion will tend to rock the rock members 102 to the position illustrated in dot and dash lines on Figure 14.

After passing the yieldable front presser track and the final core seating cam plate 171 the front core bar lock members come into engagement with a locking cam 201 which is secured as at 202 to the said cam plate 171 and which comes into function through engagement with the locking roller 104 just after the said plate 171 has, by pressure engagement with the front core bar roller 101, cooperated with a similar rear cam plate in finally seating the cores to the baking position in the mold cavities.

At the discharge station, during the opening of the molds the released cone tips fall through the open bottoms of the molds and drag over a stationary plate 203 to be properly aligned so that when they reach the end of the said plate, the molds then being fully open, they will properly fall into the depositor fingers 204 which oscillate up and down in a manner and in timed relation for receiving the cones as they fall off the end of the drag plate and for more or less gently depositing them on delivery chutes 205 which lead to the trimming mechanism generally designated 206 from whence they are delivered onto a take-off conveyor 207 to be delivered to the packers. It will be understood that any specific type of trimming mechanism may be employed and the same general type of cone aligning and depositing means, trimming mechanism and take-off mechanism are disclosed in the McLaren Patent No. 1,551,998 of September 1, 1925. These parts, in themselves, form no part of my present invention.

The mold cavities are recharged with batter approximately at the center of the machine after the molds have been locked and while the cores are lifted out of the cavities. The said cavities may be charged by any suitable batter pump or charger such as is generally indicated at 208 and which includes individual delivery squirt tubes 209 terminating in down-turned nozzles registering with the cavities. In my co-pending application filed July 21, 1928, Serial No. 294,450 I disclosed a cavity charger of the batter squirt type in which the head, carrying the charging nozzles, is also caused to oscillate about a pivot 210 to cause the nozzles to move back into register with the cavities of a mold and travel with them while charging. As stated above, however, any suitable form of cavity charger may be employed and the specific structure of the charging means forms no part of my present invention.

It will be observed that the oven covers the upper half of the machine, the lower edge of the oven terminating approximately at the axis of the wheel. During travel through the oven there are no relative movements of any of the mold unit parts, the mold halves and core bars are locked in the baking condition and the front and rear core rollers move in close relation with the safety track but not in actual contact therewith as hereinbefore described. The rotation of the wheel is in the clockwise direction when looking at the front or open side of the wheel.

As a particular unit leaves the oven in the direction of rotation of the wheel the core lock roller at the front of the wheel strikes the stationary unlocking cam 146 and forces the front core lock member 102 from the position illustrated in full lines in Figure 14 to the unlocked position illustrated in dot and dash lines in the same figure. At the same time the rear core lock roller 95 engages the cam section 148 and is moved from the position illustrated in full lines in Figure 9 of the drawings to the core standard releasing position illustrated in dot and dash lines in the same figure. Thus the cores, while remaining in the baking condition, are unlocked and free to be moved out of the mold cavities.

The core rollers 86 and 101 first come into engagement with the core track receiving nose 152 and front cracking cam 193, the said cam 193 serving to equalize the strain incident to the first movement of the core bar and the rear core track serving to first elevate the cores slightly (approximately three-quarters of an inch) and again lower them (approximately three-eighths of an inch) back into the mold cavities to assist in guiding the cones during the discharging act. Following the slight lift of the cores, the next relative movement of parts is effected by the mold cracking cam rollers 181, 189 which split the mold halves apart while the cores are still in the mold cavities. In this manner any cones which tend to adhere to the mold halves are stripped loose by the cores acting as stripper fingers. It will be understood that the cores are lifted while the cones are still so held by the mold halves that they cannot follow the movement of the cores and hence are stripped from the cores when they are lifted.

The molds are next fully opened in the manner hereinbefore described after which they are again closed and locked, after discharging the cones and, while the cores are elevated out of the cavities, are recharged with batter as they pass approximately beneath the axis of the wheel.

On continued movement of the wheel in the clockwise direction the cores are again lowered into the mold cavities, prior to which the safety cam 198 serves to relock any of the front core locks which may have become displaced.

As hereinbefore described the cores are not lowered the full distance into the mold cavities but are held out approximately one-eighth inch to facilitate steam escape. During further rotation the rear core roller 86 is acted on by the teeter and yieldable presser tracks hereinbefore referred to in detail, after which both the front and rear core rollers 86 and 101 engage the final press-down track plates 171 which seat the cores in the final baking position. Just after the cores have been finally seated the core bar locking cams 175 and 201 engage the rear and front core locking rollers 95 and 104 and move them to the relocked condition. While approaching this point the rear core lock rollers have been supported by the holder track 173 which is concentric to the axis of the wheel.

With the cores and molds thus locked in the baking condition the unit again passes into the oven to complete the cycle above described.

In the foregoing description I have disclosed a machine of the Ferris wheel type which is simple and compact in construction and comprises only two wearing bearings which are extended laterally beyond the oven and therefore not subjected to the extreme heat within the oven. This machine includes a peculiarly and advantageously shaped wheel of somewhat [-shape in cross section and in which the parts are well balanced and supported, all tendency for the wheel to twist or bear unevenly in the supporting bearings being avoided and in which the spokes are securely and rigidly held in properly spaced relation. In this machine I have also disclosed an advantageous means by which the A-frames may be secured rigidly together without binding the shaft on which the wheel is supported.

I have also disclosed a novel means by which the mold units may be quickly and easily dismounted for replacement or repair and in which all parts subject to breakage are positioned in readily accessible places so that when breakage or the necessity of replacement occurs it can be remedied in a minimum of time and with the expenditure of a minimum of labor.

I have also disclosed an adjustable-flexible mounting for the core bars. In machines in which the core bars are made absolutely rigid for purposes of strength it is found that a degree of possible efficiency in the way of flexibility must be sacrificed. Other machines in which this flexibility is provided for have lost the advantage of necessary strength. By use of the novel core bar mounting I have disclosed the desired strength and also the desired flexibility are provided for.

I have also disclosed a novel means for locking the core bars both at the front and at the rear and for equalizing the strain set up during the initial separation of the core bar from the mold. By providing the slide guide for the core bar standards at both ends, the guides being more or less remotely positioned, the strain set up by the horizontal portion of the core bar and binding tendencies are effectively overcome and avoided. By providing positive locks for the core bars at both ends, I am able to eliminate the necessity of employing squeeze tracks and also eliminate the constant drag on the tracks and the attendant wear and necessary power consumption, providing a smoother running machine with a minimum of wear and power consumption.

I have also disclosed a machine in which it is possible to employ stationary burners for the molds and also for the cores which is a decided advantage in machines of this character. The novel oven structure disclosed also adds appreciably to the advantages of the machine since it is possible to remove any portion of the oven necessary to render a selected part of the machine accessible.

Other advantages will be apparent to those skilled in the art to which the invention relates and the invention comprehends all variations of structure and detail such as fall within the scope of the appended claims.

What I claim is:

1. In pastry making machines of the Ferris wheel type, front and back supports having bearings, a shaft journalled in said bearings, a wheel comprising a body having a vertical web and a rim projecting at right angles to the web adjacent its periphery, mold units comprising male elements radially slidably mounted wholly on said web and female elements mounted on said rim, thereby providing a rotatable structure of generally [-shape in cross section, the front of the structure being open and free of obstructions from said shaft to said female molds.

2. In pastry making machines of the Ferris wheel type, front and back supports having bearings, a shaft journalled in said bearings, a wheel comprising a body having a vertical web and a rim projecting at right angles to the web adjacent its periphery, mold units comprising male elements radially slidably mounted wholly on said web and female elements mounted on said rim, thereby providing a rotatable structure of generally [-shape in cross section, a set of heating elements located concentrically with the rim for applying heat to the cores and molds.

3. In pastry making machines of the Ferris wheel type, a rotatable wheel comprising a shaft, a single side hub, spokes radiating therefrom, mold carriers secured to said spokes and projecting to one side thereof parallel to said shaft, an annulus joining the rear ends of said carriers, another annulus joining the front ends of said carriers, front and back standards with bearings for said shaft, said shaft being hollow, and means passing through said shaft for spacing and rigidly connecting together the bearing portions of the standards.

4. In pastry making machines of the Ferris wheel type, a base, a pair of spaced standards projecting upwardly from the base, shaft bearings, a rotatable wheel having a hollow shaft journalled in said bearings, said wheel being located between said standards, and means passing through said shaft and secured to said standards to space apart and rigidly connect said standards.

5. In pastry making machines of the Ferris wheel type, a base, a pair of spaced standards projecting upwardly from the base, shaft bearings, a rotatable wheel having a hollow shaft journalled in said bearings, said wheel being located between said standards, means passing through said shaft and secured to said standards to space apart and rigidly connect said standards, said means comprising a cross rod, members secured to the ends of said rod and means to secure said members to said standards.

6. In pastry making machines of the Ferris wheel type, a rotatable wheel comprising a hub plate having a hub projecting centrally to one side thereof, radially disposed webs connecting the hub and plate, spokes having ends held to the faces of said plate, certain of said spokes having their opposite edges lying radially of the wheel in proximity to one another, bolts securing said spokes to said plate, certain of the spokes being extended inwardly to adjacent the hub, and mold carriers secured at one of their ends to the outer extremities of certain of said spokes and lying parallel to said hub, and means tying together the other ends of said carriers.

7. In pastry making machines, a rotatable wheel, female molds, means to mount said molds on said wheel, said means comprising pairs of mold carriers, front and back rods on which said molds are sustained, and means to mount said rods on said carriers for bodily removal and replacement as a unit with said molds.

8. In pastry making machines, a rotatable wheel, female molds, means to mount said molds on said wheel, said means comprising pairs of mold carriers, front and back rods on which said molds are sustained, and means to mount said rods on said carriers for bodily removal and replacement as a unit with said molds, said mounting means comprising horizontal sockets for one rod and vertical sockets for the other rod, said horizontal sockets opening in a direction toward the other rod and said vertical sockets opening upwardly.

9. In pastry making machines, a rotatable wheel, female molds, means to mount said molds on said wheel, said means comprising pairs of mold carriers, front and back rods on which said molds are sustained, means to mount said rods on said carriers for bodily removal and replacement as a unit with said molds, said mounting means comprising horizontal sockets for one rod and vertical sockets for the other rod, said horizontal sockets opening in a direction toward the other rod and said vertical sockets opening upwardly, and means to hold said other rod in said vertical sockets against accidental displacement thereby to retain the mold and its rods in place.

10. In pastry making machines, a rotatable wheel, female molds, means to mount said molds on said wheel, said means comprising pairs of mold carriers, front and back rods on which said molds are sustained, and means to mount said rods on said carriers for bodily removal and replacement as a unit with said molds, said mounting means comprising horizontal sockets for one rod and vertical sockets for the other rod, said horizontal sockets opening in a direction toward the other rod and said vertical sockets opening upwardly, bridges joining the pairs of mold carriers, and means on said bridges to engage said other rod to hold same down in the vertical sockets.

11. In pastry making machines, a rotatable wheel, female molds, means to mount said molds on said wheel, said means comprising pairs of mold carriers, front and back rods on which said molds are sustained, means to mount said rods on said carriers for bodily removal and replacement as a unit with said molds, said mounting means comprising horizontal sockets for one rod and vertical sockets for the other rods, said horizontal sockets opening in a direction toward the other rods, and said vertical sockets opening upwardly, bridges joining the pairs of mold carriers, and means on said bridges to engage said other rods to hold same down in the vertical sockets, locking studs carried by said bridges, core bars with cores associated with said molds and locks on said core bars to engage said studs to lock said core bars and molds together.

12. In pastry making machines of the Ferris wheel type, a rotatable wheel composed of a shaft, a hub having a plate or disk, main spokes secured to one face of said disk and radiating therefrom, mold carriers secured to the outer ends of said spokes and projecting laterally therefrom in a direction parallel to the hub, female molds mounted between each adjacent pair of carriers, an annulus connecting said carriers adjacent the spokes, auxiliary spokes connected to said annulus and to the other face of said plate or disk, core bar carriers slidably mounted on said auxiliary spokes, core bars mounted at one end on said core bar carriers and projecting over and cooperating with said female molds, means to operate said core bar carriers for removing and replacing the core bars and cores with respect to the female molds, means to lock said core bar carriers, and other means to lock the unmounted ends of said core bars with respect to said molds.

13. In pastry making machines of the Ferris wheel type, a rotatable wheel composed of a shaft, a hub having a plate or disk, main spokes secured to one face of said disk and radiating therefrom, mold carriers secured to the outer ends of said spokes and projecting laterally therefrom in a direction parallel to the hub, female molds mounted between each adjacent pair of carriers, an annulus connecting said carriers adjacent the spokes, auxiliary spokes connected to said annulus and to the other face of said plate or disk, core bar carriers slidably mounted on said auxiliary spokes, core bars mounted at one end on said core bar carriers and projecting over and cooperating with said female molds, slide bearings mounted on said auxiliary spokes adjacent said disk, slide bars mounted in said slide bearings and attached to said core bar carriers, and toggle lock devices associated with said slide bars for locking them down.

14. In pastry making machines of the Ferris wheel type, a rotatable wheel composed of a shaft, a hub having a plate or disk, main spokes secured to one face of said disk and radiating therefrom, mold carriers secured to the outer ends of said spokes and projecting laterally therefrom in a direction parallel to the hub, female molds mounted between each adjacent pair of carriers, an annulus connecting said carriers adjacent the spokes, auxiliary spokes connected to said annulus and to the other face of said plate or disk, core bar carriers slidably mounted on said auxiliary spokes, core bars mounted at one end on said core bar carriers and projecting over and cooperating with said female molds, slide bearings mounted on said auxiliary spokes adjacent said disk, slide bars mounted in said slide bearings and attached to said core bar carriers, and toggle lock devices associated with said slide bars for locking them down, said toggle lock devices comprising forked levers to straddle said slide bars when unlocked and to engage the ends of said slide bars when locked whereby said slide bars may pass through the unlocked levers when the core bar carriers are moved toward the axis of the wheel.

15. In pastry making machines of the Ferris wheel type, a rotatable wheel composed of a shaft, a hub having a plate or disk, main spokes secured to one face of said disk and radiating therefrom, mold carriers secured to the outer ends of said spokes and projecting laterally therefrom in a direction parallel to the hub, female molds mounted between each adjacent pair of carriers, an annulus connecting said carriers adjacent the spokes, auxiliary spokes connected to said annulus and to the other face of said plate or disk, core bar carriers slidably mounted on said auxiliary spokes, core bars mounted at one end on said core bar carriers and projecting over and cooperating with said female molds, slide bearings mounted on said auxiliary spokes adjacent said disk, slide bars mounted in said slide bearings and attached to said core bar carriers, toggle lock devices associated with said slide bars for locking them down, said toggle lock devices comprising forked levers to straddle said slide bars when unlocked and to engage the ends of said slide bars when locked whereby said slide bars may pass through the unlocked levers when the core bar carriers are moved toward the axis of the wheel, and means on the ends of said slide bars for taking up wear and play between the same and said forked levers.

16. In pastry making machines of the Ferris wheel type, wherein is provided a rotatable wheel carrying mold units, each unit being composed of cores and female mold elements, means for mounting the cores which comprises a core bar slide, a spoke on which said slide is mounted for movement radially of the wheel, a core carrying bar pivotally mounted on a transverse axis to said core bar slide, and an adjustable connection permitting lost motion on said pivot if desired between said core bar and said core bar slide.

17. In pastry making machines of the Ferris wheel type wherein is provided a rotatable wheel carrying mold units, each unit being composed of cores and female mold elements, means for mounting the cores which comprises a core bar slide, a spoke on which said slide is mounted for movement radially of the wheel, a core carrying bar pivotally mounted on a transverse axis to said core bar slide, means limiting the pivotal motion between said core bar and its slide.

18. In pastry making machines of the Ferris wheel type wherein is provided a rotatable wheel carrying mold units, each unit being composed of cores and female mold elements, means for mounting the cores which comprises a core bar slide, a spoke on which said slide is mounted for movement radially of the wheel, a core carrying bar pivotally mounted on a transverse axis to said core bar slide, means limiting the pivotal motion between said core bar and its slide comprising an arm on said core bar, a bolt passing loosely through said arm and secured to said slide and having nuts at either side of said arm for the purposes specified.

19. In pastry making machines wherein is provided a rotatable wheel with male and female molds mounted thereon, means to raise and lower the male molds with respect to the female molds as the wheel is turned, a locking lug associated with each female mold, and a locking lever associated with each male mold, said lever having a locking finger to engage said lug when in one position, camming elements engaged by said lever as the wheel turns to lock and unlock the same, and a safety device associated with the male molds for holding said locking lever in the unlocked position in passing from the unlocking camming element to the locking camming element.

20. In pastry making machines wherein is provided a rotatable wheel with male and female molds mounted thereon, means to raise and lower the male molds with respect to the female molds as the wheel is turned, a locking lug associated with each female mold, and a locking lever associated with each male mold, said lever having a locking finger to engage said lug when in one position, camming elements engaged by said lever as the wheel turns to lock and unlock the same, a safety device associated with the male molds for holding said locking lever in the unlocked position in passing from the unlocking camming element to the locking camming element, and an auxiliary safety device to be engaged by said lever as the male mold is being lowered into the female mold for restraining said locking lever against movement to its locking position.

21. In pastry making machines which embody a rotatable wheel, mold devices carried by said wheel, each of said mold devices comprising separable cores and female molds, means including a core support for raising and lowering the cores from and to the female molds, means for holding the cores within the molds unseated to a predetermined degree and for a predetermined time interval following the lowering of the cores into the molds, a teetering mechanism operating on said cores after they leave the holding means, said teetering mechanism comprising a lower stationary bar having a set of spaced individually adjustable core lifters for imparting a succession of lifting impulses to the cores, and an upper bar having a set of spaced separately adjustable core depressers for imparting a succession of seating impulses to the cores.

22. In pastry making machines which embody a rotatable wheel, mold devices carried by said wheel, each of said mold devices comprising separable cores and female molds, means including a core support for raising and lowering the cores from and to the female molds, means for holding the cores within the molds unseated to a predetermined degree and for a predetermined time interval following the lowering of the cores into the molds, a teetering mechanism operating on said cores after they leave the holding means, said teetering mechanism comprising a lower stationary bar having a set of spaced core lifters for imparting a succession of lifting impulses to the cores, and an upper bar having a set of spaced core depressers for imparting a succession of impulses tending to lower the cores, said upper bar being pivotally mounted at its remote end and yieldably mounted at its approach end.

23. In pastry making machines which embody a rotatable wheel, mold devices carried by said wheel, each of said mold devices comprising separable cores and female molds, means including a core support for raising and lowering the cores from and to the female molds, means for holding the cores within the molds unseated to a predetermined degree and for a predetermined time interval following the lowering of the cores into the molds, a teetering mechanism operating on said cores after they leave the holding means, said teetering mechanism comprising a lower stationary bar having a set of spaced core lifters for imparting a succession of lifting impulses to the cores, and an upper bar having a set of individually adjustable spaced core depressers for imparting a succession of impulses tending to lower the cores, and a final squeeze and core seating cam fixedly secured to said upper bar in position following said core depresser set.

24. In pastry making machines which embody a rotatable wheel, mold devices carried by said wheel, each of said mold devices comprising separable cores and female molds, means including a core support for raising and lowering the cores from and to the female molds, means for holding the cores within the molds unseated to a predetermined degree and for a predetermined time interval following the lowering of the cores into the molds, a teetering mechanism operating on said cores after they leave the holding means, said teetering mechanism comprising a lower stationary bar having a set of spaced core lifters for imparting a succession of lifting impulses to the cores, an upper bar having a set of spaced core depressers for imparting a succession of impulses tending to lower the cores, and a final squeeze and core seating cam secured to said upper bar in position following said core depresser set, a core bar lock and a core locking cam carried by said final squeeze cam to operate said lock.

25. In pastry making apparatus, a pair of mold carriers comprising I-bars with webbed ends, each bar having a horizontal and a vertical rod socket adjacent said webbed ends, the webbed end adjacent the vertical socket having a horizontal passageway for the rods located above the vertical socket, a female mold located between said carriers, rods on which said mold is mounted, said rods lying respectively in said horizontal and vertical sockets when in place, all being arranged whereby upon lifting the rod that lies in the vertical socket into alignment with said horizontal passageways of the webs, the female mold and its rods may be bodily removed and replaced as a unit.

26. In pastry making apparatus, a pair of mold carriers comprising I-bars with webbed ends, each bar having a horizontal and a vertical rod socket adjacent said webbed ends, the webbed end adjacent the vertical socket having a horizontal passageway for the rods located above the vertical socket, a female mold located between said carriers, rods on which said mold is mounted, said rods lying respectively in said horizontal and vertical sockets when in place, a bridge joining the ends of the mold carriers adjacent the vertical sockets, and elements on the bridge to engage the rod in the vertical sockets and hold same against accidental displacement.

27. In pastry making machines, a female mold carrier comprising a frame, a female mold mounted in said frame, a core bar carrier mounted in one end of said frame, a core bar on said carrier having cores for said female mold, a locking means associated with said core bar carrier, and a locking lever pivoted to the end of said core bar, a locking lug on said frame to cooperate with said lever, said lever having two operating portions, one for locking and one for unlocking action and having a lock finger to engage said locking lug when in the locked position.

28. In pastry making machines, a female mold carrier comprising a frame, a female mold mounted in said frame, a core bar carrier mounted in one end of said frame, a core bar on said carrier having cores for said female mold, a locking means associated with said core bar carrier, and a locking lever pivoted to the end of said core bar, a locking lug on said frame to cooperate with said lever, said lever having two operating portions, one for locking and one for unlocking action and having a lock finger to engage said locking lug when in the locked position, and means on said core bar for cooperating with one of said operating portions to hold said lever in the unlocked position against accidental displacement.

29. In pastry making machines, a female mold carrier comprising a frame, a female mold mounted in said frame, a core bar carrier mounted in one end of said frame, a core bar on said carrier having cores for said female mold, a locking means associated with said core bar carrier, and a locking lever pivoted to the end of said core bar, a locking lug on said frame to cooperate with said lever, said lever having two operating portions, one for locking and one for unlocking action and having a lock finger to engage said locking lug when in the locked position, and means constituting a part of said locking finger for taking up wear.

30. In pastry making machines of the Ferris wheel type wherein is provided a wheel with mold units rotatable about a horizontal axis; a wheel mount including front and back standards having brackets, front and back horizontal hood-support bars carried by said standards, a skeleton frame mounted on said horizontal bars, quarter circular segment peripheral hood plates removably held on said skeleton frame, and quarter segment side plates removably held on said skeleton frame and said horizontal bars for the purpose described.

31. In pastry making machines of the Ferris wheel type, a rotatable wheel, mold units carried by said wheel and each comprising female molds and cores, the cores being located toward the center of the wheel and the female molds being located toward the periphery of the wheel, core and mold operating camming elements to effect timely action of the cores and molds in molding, baking and discharging the product, core locking instrumentalities, and a safety track associated with the upper half of the wheel for supporting the core rollers if breakage of the core lock should occur.

32. In a pastry making machine of the Ferris wheel type, a rotatable wheel including a hub, spokes and a rim structure, female molds located in the rim structure, core carrying bars for the female molds, means to slidably mount said core carrying bars on certain of said spokes whereby the core carrying bars may be moved radially of the wheel, said mounting means each including widely separated slide-bearing elements.

33. In pastry making machines of the Ferris wheel type, a rotatable wheel including a hub, spokes and a rim structure, female molds located in the rim structure, core carrying bars for the female molds, means to slidably mount said core carrying bars on certain of said spokes whereby the core carrying bars may be moved radially of the wheel, said mounting means each comprising a core bar carrier slidable on a spoke, a fixed slide bearing carried by said spoke, a slide bar secured at one end to said carrier and having its other end passed through said fixed slide bearing.

34. In pastry making machines, a rotatable wheel, female molds, means to mount said molds on said wheel, said means comprising pairs of mold carriers, front and back rods on which said molds are sustained, and means to mount said rods on said carriers for bodily removal and replacement as a unit with said molds, said mounting means comprising horizontal sockets for one rod and vertical sockets for the other rods.

35. In pastry making machines, a rotatable wheel, female molds, means to mount said molds on said wheel, said means comprising pairs of mold carriers, front and back rods on which said molds are sustained, and means to mount said rods on said carriers for bodily removal and replacement as a unit with said molds, said mounting means comprising horizontal sockets for one rod and vertical sockets for the other rod, and means to hold said other rod in said vertical socket against accidental displacement thereby to retain the mold and its rods in place.

36. In pastry making machines of the rotatable wheel type, a set of mold units each comprising a female mold and a core bar with a core, a pivoted locking lever on the core bar, a fixed locking lug associated with the mold, said core bar locking lever having a locking finger to engage said lug and having an operating projection, a fixed unlocking cam device to engage said operating projection, other means to move the core bar locking lever to locking position, said unlocking cam comprising a support, a cam element pivoted to said support and having a face to engage said operating projection, and means to adjust said cam element on its pivot to change the effective action of said cam element on said core bar locking lever.

37. In pastry making machines of the rotatable wheel type, a set of mold units each comprising a female mold and a core bar with a core, a pivoted locking lever on the core bar, a fixed locking lug associated with the mold, said core bar locking lever having a locking finger to engage said lug and having an operating projection, a fixed unlocking cam device to engage said operating projection, other means to move the core bar locking lever to locking position, said unlocking cam comprising a support, a cam element pivoted to said support and having a face to engage said operating projection, and means to adjust said cam element on its pivot to change the effective action of said cam element on said core bar locking lever, said cam element being pivoted at its fore end, and a roller at the pivot to initially engage said operating projection thereby to start the unlocking action.

38. In pastry making machines of the Ferris wheel type, a set of female molds located at the periphery of said wheel, a corresponding set of cores located between the periphery and center of the wheel, means for mounting said cores for movement radially of the wheel, and a core moving cam track having provisions for raising the cores out of the molds as they arrive at the lowest point of the wheel, said cam track including a removable section located at the lowest point of the wheel, whereby upon removal of the section the cores may be lowered into the molds for core adjustment purposes.

39. In pastry making machines of the Ferris wheel type, wherein is provided a plurality of sets of female molds arranged around the periphery of the wheel and a corresponding set of cores arranged within the circumference of the periphery of the wheel between molds and axis of the wheel, core bars on which the cores are mounted, core bar carriers on which said core bars are pivotally mounted, a cam track for actuating said carriers radially of the wheel to remove and replace the cores with respect to the molds, said cam track having that portion which removes the cores from the mold detachable from the remainder and located at the bottom of the wheel, whereby upon removal of said section the core bars with their cores may be lowered to the molds, and means for adjusting the position of the core bars on the carriers for the purpose specified.

40. In pastry making machines of the Ferris wheel type, a rotatable wheel composed of a shaft, a hub having a plate or disk, main spokes secured to one face of said disk and radiating therefrom, mold cariers secured to the outer ends of said spokes and projecting laterally therefrom in a direction parallel to the hub, female molds mounted between each adjacent pair of carriers, an annulus connecting said carriers adjacent the spokes, auxiliary spokes connected to said annulus and to the other face of said plate or disk, core bar carriers slidably mounted on said auxiliary spokes, core bars mounted at one end of said core bar carriers and projecting over and cooperating with said female molds, means to operate said core bar carriers for removing and replacing the core bars and cores with respect to the female molds, means to lock said core bar carriers, and other means to lock the unmounted ends of said core bars with respect to said molds, said means to operate said core bar carriers comprising a stationary cam track having a removable elevation portion at the lowermost part of the wheel whereby by removing said portion the core bars may be lowered onto the molds for adjustment purposes.

JAMES BALTON.